US012382217B2

(12) United States Patent
Sato et al.

(10) Patent No.: US 12,382,217 B2
(45) Date of Patent: Aug. 5, 2025

(54) SOUND WAVE SIGNAL PROCESSING APPARATUS AND SOUND WAVE DETECTION METHOD

(71) Applicant: Asahi Kasei Microdevices Corporation, Tokyo (JP)

(72) Inventors: Kenichi Sato, Tokyo (JP); Atsushi Nishio, Tokyo (JP); Satoshi Kasahara, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 267 days.

(21) Appl. No.: 18/322,547

(22) Filed: May 23, 2023

(65) Prior Publication Data

US 2023/0412973 A1 Dec. 21, 2023

(30) Foreign Application Priority Data

Jun. 10, 2022 (JP) ................................ 2022-094592

(51) Int. Cl.

*H04B 3/00* (2006.01)
*H04R 1/10* (2006.01)
*H04R 1/32* (2006.01)
*H03G 3/00* (2006.01)

(52) U.S. Cl.

CPC ............ *H04R 1/32* (2013.01); *H04R 1/1083* (2013.01)

(58) Field of Classification Search

CPC ................................ H04R 1/32; H04R 1/1083
USPC .................................................. 381/77, 104
See application file for complete search history.

(56) References Cited

U.S. PATENT DOCUMENTS 3,989,896 A * 11/1976 Reitboeck ............... G10L 15/00 704/209
2014/0309992 A1* 10/2014 Carney .................. G10L 21/02 704/209
2020/0243081 A1 7/2020 Kikukawa

FOREIGN PATENT DOCUMENTS

JP S57200098 A 12/1982
JP S6197700 A 5/1986
JP H05134697 A 5/1993

* cited by examiner

*Primary Examiner* — Ammar T Hamid

(57) ABSTRACT

A sound wave signal processing apparatus may include: an extraction unit configured to extract, from a sound wave signal, a plurality of frequency signals indicating respective frequency components of a plurality of frequency bands including different set frequencies; a setting unit configured to set a set frequency of the extraction unit on the basis of a comparison result between output levels of the frequency signals of the different set frequencies extracted by the extraction unit; and a detection unit configured to detect a formant frequency band including a formant frequency in the sound wave signal on the basis of a comparison result group between the output levels of the frequency signals of the different set frequencies extracted by the extraction unit, a setting history of the set frequency of the extraction unit by the setting unit, and a frequency characteristic of the extraction unit.

20 Claims, 15 Drawing Sheets

| CURRENT SET FREQUENCY RELATIVE TO PREVIOUS SET FREQUENCY | CURRENT OUTPUT LEVEL RELATIVE TO PREVIOUS OUTPUT LEVEL | NEXT SET FREQUENCY |
|---|---|---|
| UP | UP | UP |
| UP | DN | DN |
| DN | UP | DN |
| DN | DN | UP |

*FIG.8*

| | PREVIOUS SET FREQUENCY RELATIVE TO SECOND-PREVIOUS SET FREQUENCY | SECOND-PREVIOUS OUTPUT LEVEL OF FIRST BPF < PREVIOUS OUTPUT LEVEL OF FIRST BPF | CURRENT SET FREQUENCY RELATIVE TO PREVIOUS SET FREQUENCY | PREVIOUS OUTPUT LEVEL OF FIRST BPF < CURRENT OUTPUT LEVEL OF FIRST BPF | PEAK DETECTION |
|---|---|---|---|---|---|
| CONDITION 1 | UP | YES | UP | NO | DETECTED |
| CONDITION 2 | DOWN | YES | DOWN | NO | DETECTED |

FIG.9

SOUND WAVE SIGNAL PROCESSING APPARATUS AND SOUND WAVE DETECTION METHOD

The contents of the following patent application(s) are incorporated herein by reference:

NO. 2022-094592 filed in JP on Jun. 10, 2022

BACKGROUND

1. Technical Field

The present invention relates to a sound wave signal processing apparatus and a sound wave detection method.

2. Related Art

Patent Document 1 discloses a voice recognition apparatus that optimizes the center frequency of each band pass filter on the basis of a predetermined feature parameter pattern stored in advance and a feature parameter pattern obtained from an input voice corresponding to the predetermined feature parameter pattern.

CITATION LIST

Patent Document

Patent Document 1: Japanese Patent Application Publication No. H05-134697

BRIEF DESCRIPTION OF THE DRAWINGS

FIG. 8 is a diagram illustrating an example of a condition table for deciding the set frequency.

FIG. 9 is a diagram illustrating an example of a condition table for detecting a formant frequency band including a first formant frequency.

DESCRIPTION OF EXEMPLARY EMBODIMENTS

Hereinafter, embodiments of the present invention will be described. However, the following embodiments are not for limiting the invention according to the claims. In addition, not all combinations of features described in the embodiment are essential to the solution of the invention.

Figure 1:
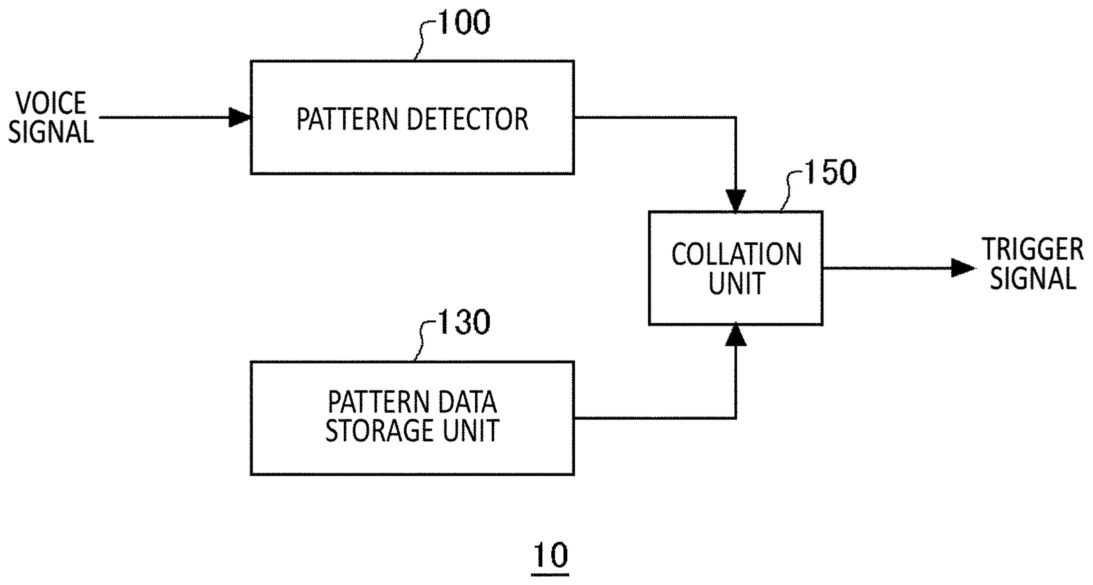
FIG. 1 is a diagram illustrating an example of functional blocks of a wake word detector.

FIG. 1 is a diagram illustrating an example of functional blocks of a wake word detector 10. The wake word detector 10 starts predetermined processing when recognizing that a voice uttered by a user is a voice registered in advance. The wake word detector 10 may be built in a wearable terminal such as smart glasses, for example. The wake word detector 10 is an example of a sound wave signal processing apparatus.

The wake word detector 10 includes a pattern detector 100, a pattern data storage unit 130, and a collation unit 150.

The pattern detector 100 outputs a temporal change pattern of a frequency band which is detected, from a voice signal, as a formant frequency band including a first formant frequency every 5 ms. The pattern data storage unit 130 stores a reference change pattern that is the temporal change pattern of the formant frequency band including the first formant frequency of every 5 ms in a wake word which is a voice to be uttered by the user to cause an apparatus such as a wearable terminal to start predetermined processing. By collating the change pattern output from the pattern detector 100 with the reference change pattern stored in the pattern data storage unit 130, the collation unit 150 outputs a trigger signal for causing the apparatus such as a wearable terminal to start the predetermined processing when the change pattern matches the reference change pattern. Herein, the voice signal is an example of a sound wave signal. The formant frequency may be not only a resonance frequency in a voice uttered by a human but also a frequency in a sound emitted by a non-human being. The pattern detector 100 may detect, as the sound emitted by the non-human being, a sound wave signal indicating a machine sound. For example, the pattern detector 100 may detect an abnormal pattern of a steam sound in a factory or the like, or may detect an abnormal pattern of a bearing sound. Alternatively, the pattern detector 100 may detect, as the sound emitted by the non-human being, a sound wave signal indicating an artificial sound. For example, the pattern detector 100 may detect an artificial sound, such as chimes, alarms, and warnings, to notify a system of event occurrences. In addition, the pattern detector 100 may detect, as the sound wave signal, an ultrasonic signal as the sound emitted by the non-human being. For example, the pattern detector 100 may detect a frequency-modulated ultrasonic signal as a control command for remote control.

Figure 2:
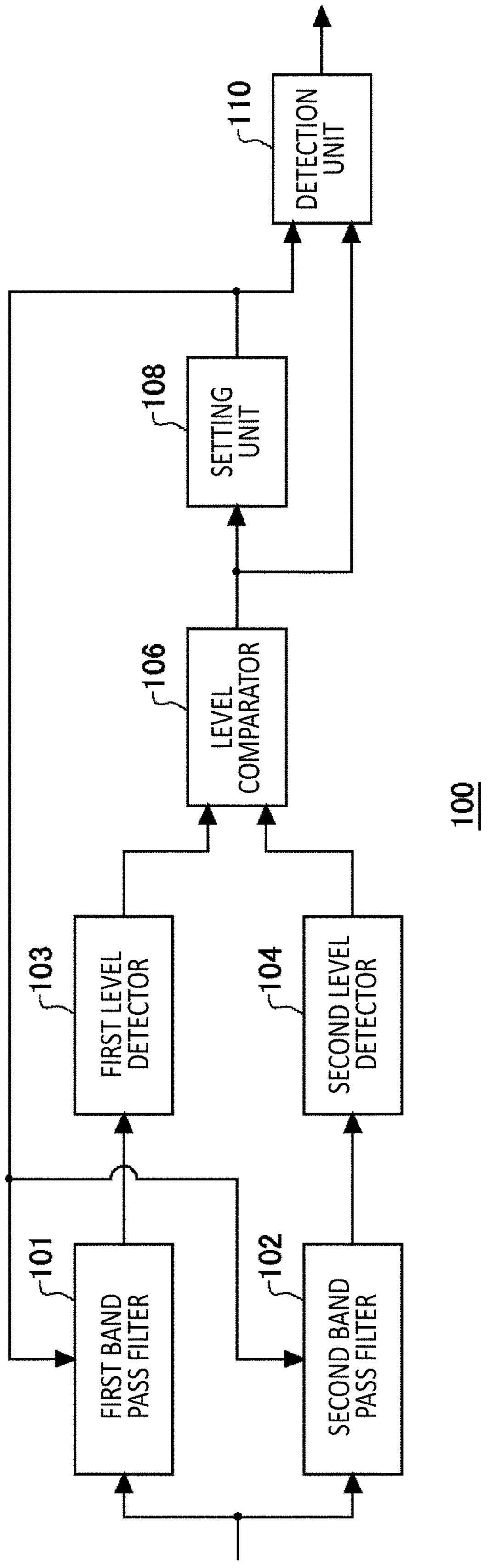
FIG. 2 is a diagram illustrating an example of functional blocks of a pattern detector according to a first embodiment.

FIG. 2 is a diagram illustrating an example of functional blocks of the pattern detector 100 according to a first embodiment. The pattern detector 100 includes a first band pass filter (first BPF) 101, a second band pass filter (second BPF) 102, a first level detector 103, a second level detector 104, a level comparator 106, a setting unit 108, and a detection unit 110. Note that the pattern detector 100 may include three or more band pass filters (BPF).

The first BPF 101 and the second BPF 102 are examples of an extraction unit that extracts, from the voice signal, a plurality of frequency signals indicating respective frequency components of a plurality of frequency bands including different set frequencies. The set frequency may be a center frequency of the frequency band extracted from the voice signal.

The first BPF 101 and the second BPF 102 are filter circuits capable of changing a set frequency that is a center frequency of a frequency band to be passed. The first BPF 101 and the second BPF 102 extract, from the voice signal, frequency signals indicating frequency components of frequency bands having different center frequencies, and output the frequency signals. The center frequency of the first BPF 101 may be lower than the center frequency of the second BPF 102. The center frequency of the first BPF 101 may be lower than the center frequency of the second BPF 102 by a predetermined ratio. For example, when the center frequency of the first BPF 101 is 600 Hz, the center frequency of the second BPF 102 may be 720 Hz which is higher than the center frequency of the first BPF 101 by 20%.

The first level detector 103 derives an average value of the output levels of the frequency signals, which are output from the first BPF 101, for each predetermined period (for example, 5 ms), and outputs a first output level signal indicating the derived average value. The second level detector 104 derives an average value of the output levels of the frequency signals, which are output from the second BPF 102, for each predetermined period (for example, 5 ms), and outputs a second output level signal indicating the derived average value.

The level comparator 106 compares the first output level signal output from the first level detector 103 with the second output level signal output from the second level detector 104 to determine which of the output level of the frequency signal output from the first BPF 101 and the output level of the frequency signal output from the second BPF 102 is higher, and outputs a signal indicating a comparison result.

On the basis of the comparison result of the level comparator 106, the setting unit 108 decides a set frequency that is the center frequency to be set in each of the first BPF 101 and the second BPF 102, and sets the decided set frequencies as the center frequencies of the first BPF 101 and the second BPF 102. On the basis of the comparison result of the level comparator 106, the setting unit 108 decides the set frequency that is the center frequency to be set in each of the first BPF 101 and the second BPF 102 for each predetermined period (for example, 5 ms), and updates the set frequency of each of the first BPF 101 and the second BPF 102 by setting the decided set frequencies as the center frequencies of the first BPF 101 and the second BPF 102.

When the output level of the first output level signal is higher than the output level of the second output level signal, the setting unit 108 sets the set frequencies of the first BPF 101 and the second BPF 102 to be lower than the current set frequency by a predetermined ratio (for example, 20%). On the other hand, when the output level of the first output level signal is lower than the output level of the second output level signal, the setting unit 108 sets the set frequencies of the first BPF 101 and the second BPF 102 to be higher than the current set frequency by a predetermined ratio (for example, 20%).

The detection unit 110 detects the formant frequency band including the formant frequency in the voice signal on the basis of the comparison result group of the output levels by the level comparator 106, the setting history of the set frequencies of the first BPF 101 and the second BPF 102 by the setting unit 108, and the frequency characteristics of the first BPF 101 and the second BPF 102. The comparison result group includes a past comparison result of the output level in addition to a current comparison result of the output level by the level comparator 106. The comparison result group may include the current comparison result of the output level by the level comparator 106, the previous comparison result of the output level, and a second-previous comparison result. The detection unit 110 may detect the formant frequency band by comparing the output levels of the frequency signals of at least three set frequencies output from the first BPF 101 and the second BPF 102. The formant frequency band may have a frequency width of about ±10% around the first formant frequency. The setting history of the set frequency may indicate a setting history of the set frequency of each of the first BPF 101 and the second BPF 102 by the setting unit 108. The setting history may indicate the second-previous, previous, and current set frequencies of each of the first BPF 101 and the second BPF 102 by the setting unit 108. The setting history may indicate whether the previous set frequencies of the first BPF 101 and the second BPF 102 by the setting unit 108 are lower or higher than the second-previous set frequencies, and whether the current set frequencies of the first BPF 101 and the second BPF 102 by the setting unit 108 are lower or higher than the previous set frequencies. The frequency characteristics of the first BPF 101 and the second BPF 102 may be transfer functions of the first BPF 101 and the second BPF 102.

The detection unit 110 may detect the formant frequency band by comparing the output levels of the frequency signals of at least two set frequencies output from the first BPF 101 and the second BPF 102. When the detection unit 110 detects the formant frequency band on the basis of the set frequency having the higher output level only by comparing two set frequencies, there is a case where the frequency band including the first formant frequency cannot be detected as the formant frequency band. That is, there is a possibility that the first formant frequency exists near a set frequency higher or lower than the two set frequencies. In this regard, in a case where the detection unit 110 detects the formant frequency band on the basis of the set frequency having the higher output level only by the comparison between two set frequencies, when a difference between the output level of the first set frequency and the output level of the second set frequency is greater than or equal to a predetermined difference, the detection unit does not need to detect the formant frequency band on the basis of the set frequency having the higher output level only by the comparison between the two set frequencies. That is, when a difference between the output levels of two frequency signals output from the first BPF 101 and the second BPF 102 is smaller than the predetermined difference, the detection unit 110 may detect the formant frequency band on the basis of the set frequency of the frequency signal having the higher output level of the output levels of the two frequency signals.

When the output level of the frequency signal of a second set frequency higher than a first set frequency is higher than the output level of the frequency signal of the first set frequency, and the output level of the frequency signal of a third set frequency higher than the second set frequency is lower than the output level of the frequency signal of the second set frequency, the detection unit 110 may detect the formant frequency band on the basis of the second set frequency.

Figure 3A:
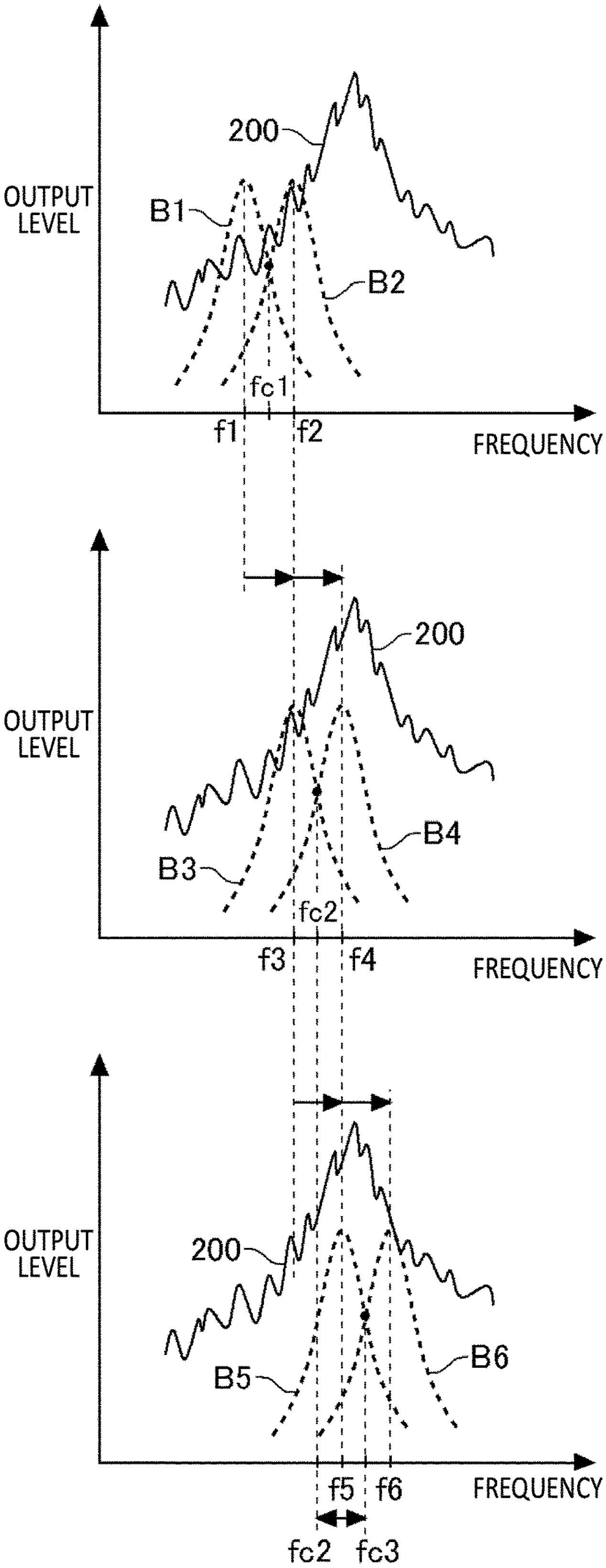
FIG. 3A is a diagram for explaining an example of a procedure of detecting a formant frequency band.

As illustrated in FIG. 3A, the first BPF 101 of a transfer function B1 of which the set frequency is set to a set frequency f1 by the setting unit 108 extracts a frequency signal S1 from a voice signal 200. In addition, the second BPF 102 of a transfer function B2 of which the set frequency is set to a set frequency f2 higher than the set frequency f1 by the setting unit 108 extracts a frequency signal S2 from the voice signal 200.

The first level detector 103 outputs an output level signal L1 indicating, as the output level of the frequency signal S1, an average value of output levels of the frequency signal S1 in a predetermined period. The second level detector 104 outputs an output level signal L2 indicating, as the output level of the frequency signal S2, an average value of output levels of the frequency signal S2 in the predetermined period. The level comparator 106 compares the output level signal L1 with the output level signal L2 to determine whether the output level of the frequency signal S1 is lower or higher than the output level of the frequency signal S2, and outputs the comparison result.

When the comparison result indicates that the output level of the frequency signal S1 output from the first level detector 103 is lower than the output level of the frequency signal S2, the setting unit 108 sets the set frequency of the first BPF 101 to a set frequency f3 higher than the set frequency f1. Further, the setting unit 108 sets the set frequency of the second BPF 102 to a set frequency f4 higher than the set frequency f2 and the set frequency f3. The first BPF 101 of the transfer function B3 of which the set frequency is set to the set frequency f3 by the setting unit 108 extracts a frequency signal S3 from the voice signal. The set frequency f3 may be the same as the set frequency f2.

The second BPF 102 of a transfer function B4 of which the set frequency is set to the set frequency f4 by the setting unit 108 extracts a frequency signal S4 from the voice signal. Then, when the output level of the frequency signal S4 is lower than the output level of the frequency signal S3, the detection unit 110 detects, as the formant frequency band, a frequency band between a cross point frequency fc1, which is a common frequency having the same gain between the GBPF(f1, f) indicating the transfer function B1 and the GBPF(f2, f) indicating the transfer function B2, and a cross point frequency fc2, which is a common frequency having the same gain between the GBPF(f3, f) indicating the transfer function B3 and the GBPF(f4, f) indicating the transfer function B4. That is, the detection unit 110 derives, as the cross point frequency fc1, a frequency f satisfying GBPF(f1, f)=GBPF(f2, f), derives, as the cross point frequency fc2, a frequency f satisfying GBPF(f3, f)=GBPF(f4, f), and detects, as the formant frequency band, a frequency band having the cross point frequency fc1 as one end and the cross point frequency fc2 as the other end.

On the other hand, as illustrated in FIG. 3A, when the output level of the frequency signal S4 is higher than the output level of the frequency signal S3, the setting unit 108 sets the set frequency of the first BPF 101 to a set frequency f5 higher than the set frequency f3. Further, the setting unit 108 sets the set frequency of the second BPF 102 to a set frequency f6 higher than the set frequency f4 and the set frequency f5. The first BPF 101 of a transfer function B5 of which the set frequency is set to the set frequency f5 by the setting unit 108 extracts a frequency signal S5 from the voice signal 200. The set frequency f5 may be the same as the set frequency f4. The second BPF 102 of a transfer function B6 of which the set frequency is set to the set frequency f6 by the setting unit 108 extracts a frequency signal S6 from the voice signal 200. Then, when the output level of the frequency signal S6 is lower than the output level of the frequency signal S5, the detection unit 110 detects, as the formant frequency band, a frequency band between a cross point frequency fc2, which is a common frequency having the same gain between the GBPF(f3, f) indicating the transfer function B3 and the GBPF(f4, f) indicating the transfer function B4, and a cross point frequency fc3, which is a common frequency having the same gain between the GBPF(f5, f) indicating the transfer function B5 and the GBPF(f6, f) indicating the transfer function B6. That is, the detection unit 110 derives, as the cross point frequency fc2, a frequency f satisfying GBPF(f3, f)=GBPF(f4, f), derives, as the cross point frequency fc3, a frequency f satisfying GBPF(f5, f)=GBPF(f6, f), and detects, as the formant frequency band, a frequency band having the cross point frequency fc2 as one end and the cross point frequency fc3 as the other end.

Figure 3B:
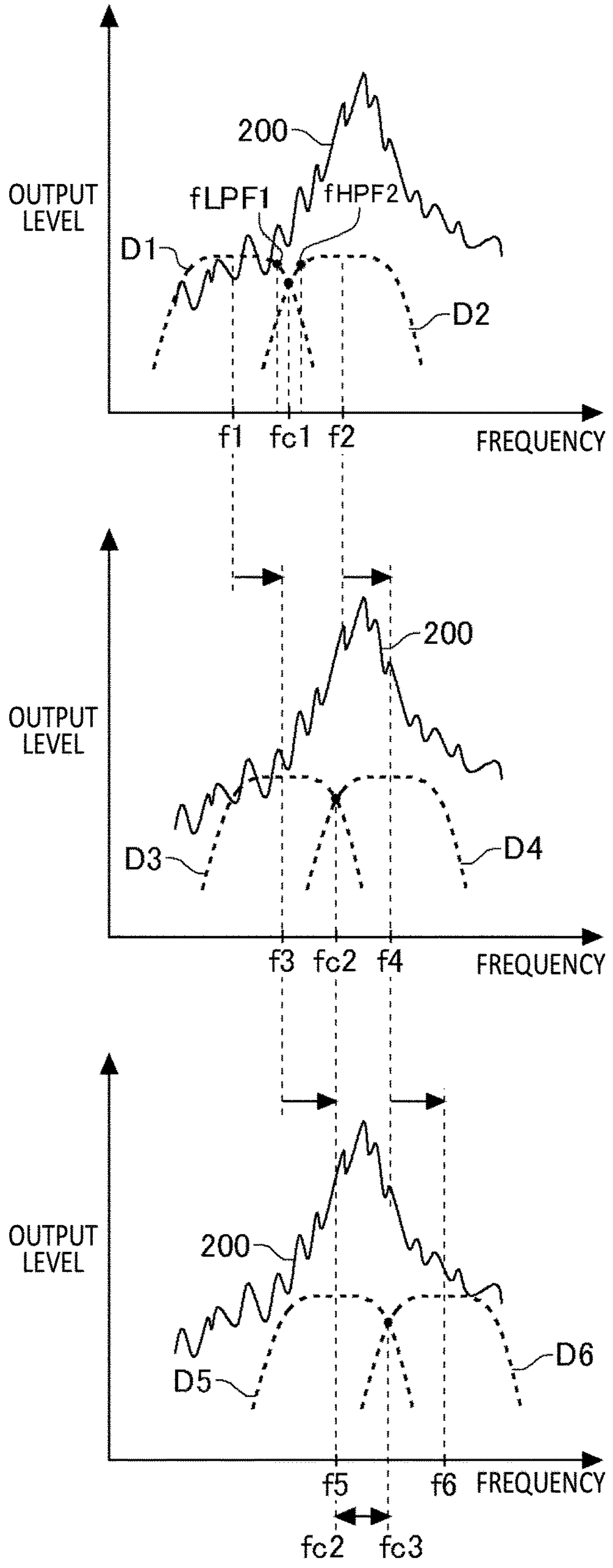
FIG. 3B is a diagram for explaining an example of the procedure of detecting the formant frequency band.

As illustrated in FIG. 3B, the frequency characteristic of the first BPF 101 and the frequency characteristic of the second BPF 102 may have a wider frequency band with a high gain than that illustrated in FIG. 3A. That is, the first BPF 101 of a transfer function D1 of which the set frequency is set to the set frequency f1 by the setting unit 108 extracts the frequency signal S1 from the voice signal 200. In addition, the second BPF 102 of a transfer function D2 of which the set frequency is set to the set frequency f2 higher than the set frequency f1 by the setting unit 108 extracts the frequency signal S2 from the voice signal 200.

The first level detector 103 outputs the output level signal L1 indicating, as the output level of the frequency signal S1, an average value of output levels of the frequency signal S1 in the predetermined period. The second level detector 104 outputs an output level signal L2 indicating, as the output level of the frequency signal S2, an average value of output levels of the frequency signal S2 in the predetermined period. The level comparator 106 compares the output level signal L1 with the output level signal L2 to determine whether the output level of the frequency signal S1 is lower or higher than the output level of the frequency signal S2, and outputs the comparison result.

When the comparison result indicates that the output level of the frequency signal S1 output from the first level detector 103 is lower than the output level of the frequency signal S2, the setting unit 108 sets the set frequency of the first BPF 101 to a set frequency f3 higher than the set frequency f1. Further, the setting unit 108 sets the set frequency of the second BPF 102 to a set frequency f4 higher than the set frequency f2 and the set frequency f3. The first BPF 101 of a transfer function D3 of which the set frequency is set to the set frequency f3 by the setting unit 108 extracts the frequency signal S3 from the voice signal. The set frequency f3 may be the same as the set frequency f2. The second BPF 102 of a transfer function D4 of which the set frequency is set to the set frequency f4 by the setting unit 108 extracts the frequency signal S4 from the voice signal.

Herein, a low-pass cutoff frequency fLPF1 of the first BPF 101 of the transfer function D1 set to the set frequency f1 is set such that $fLPF1=\alpha\times f1$ (for example, $\alpha=1.5$). A high-pass cutoff frequency fHPF2 of the second BPF 102 of the transfer function D2 set to the set frequency f2 is set such that $fHPF2=\beta\times f2$ (for example, $\beta=0.7$). Further, a transfer function indicating a low-pass frequency characteristic at a frequency equal to or higher than the set frequency f1 in the GBPF1($f$) indicating the transfer function D1 of the first BPF 101 is set as a GLPF1(fLPF1, f). The GLPF1(fLPF1, f) has, as parameters, the low-pass cutoff frequency fLPF1 equal to or higher than the frequency f1 in the GBPF1($f$) indicating the transfer function D1 of the first BPF 101 and a signal frequency f. A transfer function indicating a high-pass frequency characteristic at a frequency equal to or lower than the set frequency f2 in the GBPF2(*f*) indicating the transfer function D2 of the second BPF 102 is set as a GHPF2(fHPF2, f). The GHPF2(fHPF2, f) has, as parameters, the high-pass cutoff frequency fHPF2 equal to or lower the frequency f2 in the GBPF2(*f*) indicating the transfer function D2 of the second BPF 102 and the signal frequency f.

The detection unit 110 detects, as the cross point frequency fc1, a frequency f satisfying GBPF1(*f*)=GBPF2(*f*). Therefore, the detection unit 110 can detect, as the cross point frequency fc1, a frequency f satisfying GLPF1(fLPF1, f)=GHPF2(fHPF2, f). Since the relationships between fLPF1 and 11 and fHPF2 and f2 are known, the detection unit 110 can detect the cross point frequency fc1 on the basis of the GBPF1(*f*) indicating the transfer function D1 and the GBPF2(*f*) indicating the transfer function D2, and the set frequency f1 and the set frequency f2.

After the first BPF 101 extracts the frequency signal S3 and the second BPF 102 extracts the frequency signal S4, the first level detector 103 outputs an output level signal L3 indicating, as the output level of the frequency signal S3, an average value of output levels of the frequency signal S3 in the predetermined period. The second level detector 104 outputs an output level signal L4 indicating, as the output level of the frequency signal S4, an average value of output levels of the frequency signal S4 in the predetermined period. The level comparator 106 compares the output level signal L3 with the output level signal L4 to determine whether the output level of the frequency signal S3 is lower or higher than the output level of the frequency signal S4, and outputs the comparison result.

When the output level of the frequency signal S4 is lower than the output level of the frequency signal S3, the detection unit 110 detects, as the formant frequency band, a frequency band between the cross point frequency fc1, which is a common frequency having the same gain between the GBPF(f1, f) indicating the transfer function D1 and the GBPF(f2, f) indicating the transfer function D2, and the cross point frequency fc2, which is a common frequency having the same gain between the GBPF(f3, f) indicating the transfer function D3 and the GBPF(f4, f) indicating the transfer function D4. That is, the detection unit 110 derives, as the cross point frequency fc1, a frequency f satisfying GBPF(f1, f)=GBPF(f2, f), derives, as the cross point frequency fc2, a frequency f satisfying GBPF(f3, f)=GBPF(f4, f), and detects, as the formant frequency band, a frequency band having the cross point frequency fc1 as one end and the cross point frequency fc2 as the other end.

On the other hand, as illustrated in FIG. 3B, when the output level of the frequency signal S4 is higher than the output level of the frequency signal S3, the setting unit 108 sets the set frequency of the first BPF 101 to the set frequency f5 higher than the set frequency f3. Further, the setting unit 108 sets the set frequency of the second BPF 102 to a set frequency f6 higher than the set frequency f4 and the set frequency f5. The first BPF 101 of a transfer function D5 of which the set frequency is set to the set frequency f5 by the setting unit 108 extracts the frequency signal S5 from the voice signal 200. The set frequency f5 may be the same as the set frequency f4. The second BPF 102 of a transfer function D6 of which the set frequency is set to the set frequency f6 by the setting unit 108 extracts the frequency signal S6 from the voice signal 200. Then, when the output level of the frequency signal S6 is lower than the output level of the frequency signal S5, the detection unit 110 detects, as the formant frequency band, a frequency band between the cross point frequency fc2, which is a common frequency having the same gain between the GBPF(f3, f) indicating the transfer function D3 and the GBPF(f4, f) indicating the transfer function D4, and a cross point frequency fc3, which is a common frequency having the same gain between the GBPF(f5, f) indicating the transfer function D5 and the GBPF(f6, f) indicating the transfer function D6.

Figure 4:
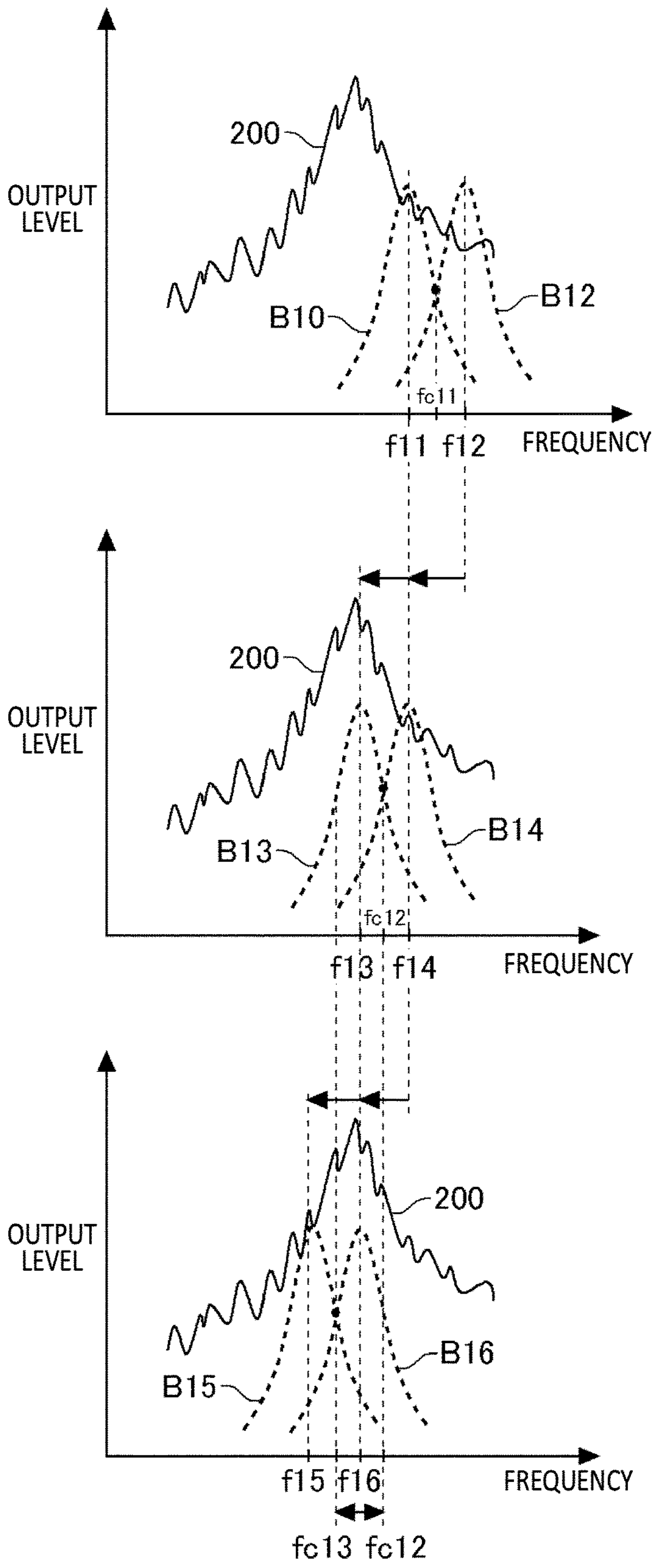
FIG. 4 is a diagram for explaining an example of the procedure of detecting the formant frequency band.

Alternatively, as illustrated in FIG. 4, the first BPF 101 of a transfer function B10 of which the set frequency is set to a set frequency f11 by the setting unit 108 extracts a frequency signal S11 from the voice signal 200. In addition, the second BPF 102 of a transfer function B12 of which the set frequency is set to a set frequency f12 higher than the set frequency f11 by the setting unit 108 extracts a frequency signal S12 from the voice signal 200.

The first level detector 103 outputs an output level signal L11 indicating, as the output level of the frequency signal S11, an average value of output levels of the frequency signal S11 in the predetermined period. The second level detector 104 outputs an output level signal L12 indicating, as the output level of the frequency signal S12, an average value of output levels of the frequency signal S12 in the predetermined period. The level comparator 106 compares the output level signal L11 with the output level signal L12 to determine whether the output level of the frequency signal S11 is lower or higher than the output level of the frequency signal S12, and outputs the comparison result.

When the comparison result indicates that the output level of the frequency signal S11 output from the first level detector 103 is higher than the output level of the frequency signal S12, the setting unit 108 sets the set frequency of the first BPF 101 to the set frequency f13 lower than the set frequency f11. Further, the setting unit 108 sets the set frequency of the second BPF 102 to a set frequency f14 lower than the set frequency f12 and higher than the set frequency f13. The first BPF 101 of a transfer function B13 of which the set frequency is set to the set frequency f13 by the setting unit 108 extracts a frequency signal S13 from the voice signal. The set frequency f14 may be the same as the set frequency f11.

The second BPF 102 of a transfer function B14 of which the set frequency is set to the set frequency f14 by the setting unit 108 extracts a frequency signal S14 from the voice signal. Then, when the output level of the frequency signal S14 is higher than the output level of the frequency signal S13, the detection unit 110 detects, as the formant frequency band, a frequency band between a cross point frequency fc11, which is a common frequency having the same gain between the GBPF(f11, f) indicating the transfer function B10 and the GBPF(f12, f) indicating the transfer function B12, and a cross point frequency fc12, which is a common frequency having the same gain between the GBPF(f13, f) indicating the transfer function B13 and the GBPF(f14, f) indicating the transfer function B14.

On the other hand, as illustrated in FIG. 4, when the output level of the frequency signal S14 is lower than the output level of the frequency signal S13, the setting unit 108 sets the set frequency of the first BPF 101 to the set frequency f15 lower than the set frequency f13. Further, the setting unit 108 sets the set frequency of the second BPF 102 to a set frequency f16 lower than the set frequency f14 and higher than the set frequency f15. The first BPF 101 of a transfer function B15 of which the set frequency is set to the set frequency f15 by the setting unit 108 extracts a frequency signal S15 from the voice signal 200. The set frequency f16 may be the same as the set frequency f13. The second BPF 102 of a transfer function B16 of which the set frequency is set to the set frequency f16 by the setting unit 108 extracts a frequency signal S16 from the voice signal 200. Then, when the output level of the frequency signal S16 is higher than the output level of the frequency signal S15, the detection unit 110 detects, as the formant frequency band, a frequency band between a cross point frequency fc12, which is a common frequency having the same gain between the GBPF(f13, f) indicating the transfer function B13 and the GBPF(f14, f) indicating the transfer function B14, and a cross point frequency fc13, which is a common frequency having the same gain between the GBPF(f15, f) indicating the transfer function B15 and the GBPF(f16, f) indicating the transfer function B16.

Figure 5:
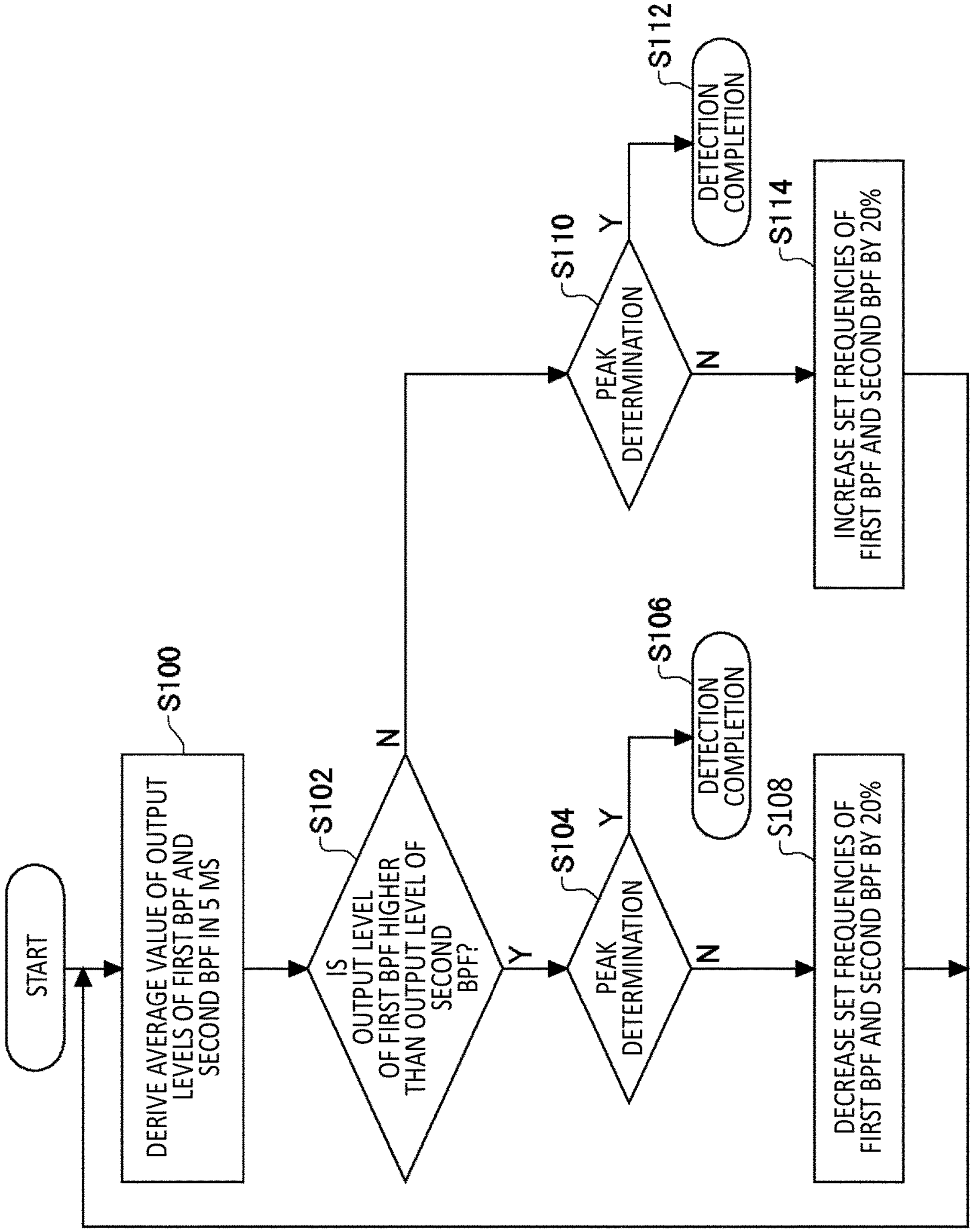
FIG. 5 is a flowchart illustrating an example of the procedure of detecting the formant frequency band by a first BPF and a second BPF in the first embodiment.

FIG. 5 is a flowchart illustrating an example of a procedure of detecting the formant frequency band according to the first embodiment.

The first level detector 103 derives an average value of output levels of the first frequency signal output from the first BPF 101 in 5 ms. In addition, the second level detector 104 derives an average value of output levels of the second frequency signal output from the second BPF 102 in 5 ms (S100).

The level comparator 106 compares the current output level of the first BPF 101 with the current output level of the second BPF 102 to determine whether the current output level of the first BPF 101 is higher or lower than the current output level of the second BPF 102 (S102). The detection unit 110 detects the formant frequency band including the first formant frequency in the voice signal by performing the peak determination of the voice signal on the basis of the comparison result between the output levels of the first BPF 101 and the second BPF 102 and the setting history of the set frequencies of the first BPF 101 and the second BPF 102 (S104). When the previous output level of the first BPF 101 is lower than the previous output level of the second BPF 102 and the current set frequencies of the first BPF 101 and the second BPF 102 are set to be higher than the previous set frequency, so that the current output level of the first BPF 101 is higher than the current output level of the second BPF 102, the detection unit 110 detects, as the formant frequency band, a frequency band between a previous cross point frequency, which is a common frequency having the same gain in the frequency characteristic of each of the first BPF 101 and the second BPF 102 set to the previous set frequency, and a current cross point frequency, which is a common frequency having the same gain in the frequency characteristic (transfer function) of each of the first BPF 101 and the second BPF 102 set to the current set frequency, and completes detection processing (S106).

On the other hand, when the previous output level of the first BPF 101 is higher than the previous output level of the second BPF 102 and the current set frequencies of the first BPF 101 and the second BPF 102 are set to be lower than the previous set frequency, so that the current output level of the first BPF 101 is higher than the current output level of the second BPF 102, the detection unit 110 determines that the peak of the voice signal cannot be detected, and the setting unit 108 decreases the set frequencies of the first BPF 101 and the second BPF 102 by 20% (S108).

On the other hand, when the current output level of the first BPF 101 is lower than the current output level of the second BPF 102, the detection unit 110 detects the formant frequency band including the first formant frequency in the voice signal by performing the peak determination of the voice signal on the basis of the comparison result between the output levels of the first BPF 101 and the second BPF 102, the setting history of the set frequencies of the first BPF 101 and the second BPF 102, and the frequency characteristics of the first BPF 101 and the second BPF 102 (S110). When the previous output level of the first BPF 101 is higher than the previous output level of the second BPF 102, and the current set frequencies of the first BPF 101 and the second BPF 102 are set to be lower than the previous set frequency, so that the current output level of the first BPF 101 is lower than the current output level of the second BPF 102, the detection unit 110 detects, as the formant frequency band, a frequency band between a previous cross point frequency, which is a common frequency having the same gain in the frequency characteristic (transfer function) of each of the first BPF 101 and the second BPF 102 set to the previous set frequency, and a current cross point frequency, which is a common frequency having the same gain in the frequency characteristic of each of the first BPF 101 and the second BPF 102 set to the current set frequency, and completes the detection processing (S112).

When the previous output level of the first BPF 101 is lower than the previous output level of the second BPF 102, and the current set frequencies of the first BPF 101 and the second BPF 102 are set to be higher than the previous set frequency, so that the current output level of the first BPF 101 is lower than the current output level of the second BPF 102, the detection unit 110 determines that the peak of the voice signal cannot be detected, and the setting unit 108 increases the set frequency of the first BPF 101 and the second BPF 102 by 20% (S114).

When the pattern detector 100 repeats the above processing, the setting unit 108 can set the set frequencies of the first BPF 101 and the second BPF 102 such that the first BPF 101 and the second BPF 102 can extract, from the voice signal, the frequency signal of the frequency band near the formant frequency at which the output level peaks.

The detection unit 110 detects, from the voice signal, the formant frequency band including the first formant frequency at which the output level peaks while changing the set frequency of the first BPF 101 and the second BPF 102 on the basis of the comparison result of the output levels of the frequency signals output from the first BPF 101 and the second BPF 102. By using two band pass filters of the first BPF 101 and the second BPF 102, the pattern detector 100 can detect, from the voice signal, the formant frequency band including the first formant frequency at which the output level peaks.

By sequentially recording the formant frequency band including the first formant frequency at which the output level peaks, the detection unit 110 can record the temporal change pattern of the formant frequency band including the first formant frequency in the voice signal.

For example, the temporal change pattern of the first formant frequency can be detected by using a plurality of BPFs to cover the entire frequency band that can be detected as the first formant frequency. However, in this case, for example, in order to analyze human voice, eleven BPFs are arranged at intervals of about 20% between 300 Hz and 2 kHz, and the output levels of the respective BPFs are compared, so that the center frequency of the BPF with the maximum output level is detected as the first formant frequency. However, in such a configuration, the number of BPFs is large, and the number of components is increased, so that power consumption cannot be suppressed and cost reduction cannot be achieved.

In addition, it is conceivable to detect the set frequency, at which the output level is maximized, by sweeping while detecting the output level at a predetermined ratio such as 20% of the set frequency from the lowest frequency to the highest frequency, for example, from 300 Hz to 2 kHz by using one or more BPFs. However, in such a method, an average interval of 5 ms is required 11 times to sweep while changing the set frequency, for example, every 20% from 300 Hz to 2 kHz by using one BPF, and thus it takes 55 ms to detect the set frequency at which the output level peaks. In addition, the data of the formant frequency can be acquired only every 55 ms.

On the other hand, the pattern detector 100 according to the first embodiment sequentially detects the formant frequency band including the first formant frequency between two cross point frequencies while changing the set frequencies of two BPFs on the basis of the comparison result of the output levels of the two BPFs. As a result, it is possible to detect the temporal change pattern of the formant frequency band including the first formant frequency, for example, at an interval of 5 ms by using the two BPFs, and to realize reduction in the number of components of the pattern detector 100, reduction in power consumption, cost reduction, and the like.

Figure 6:
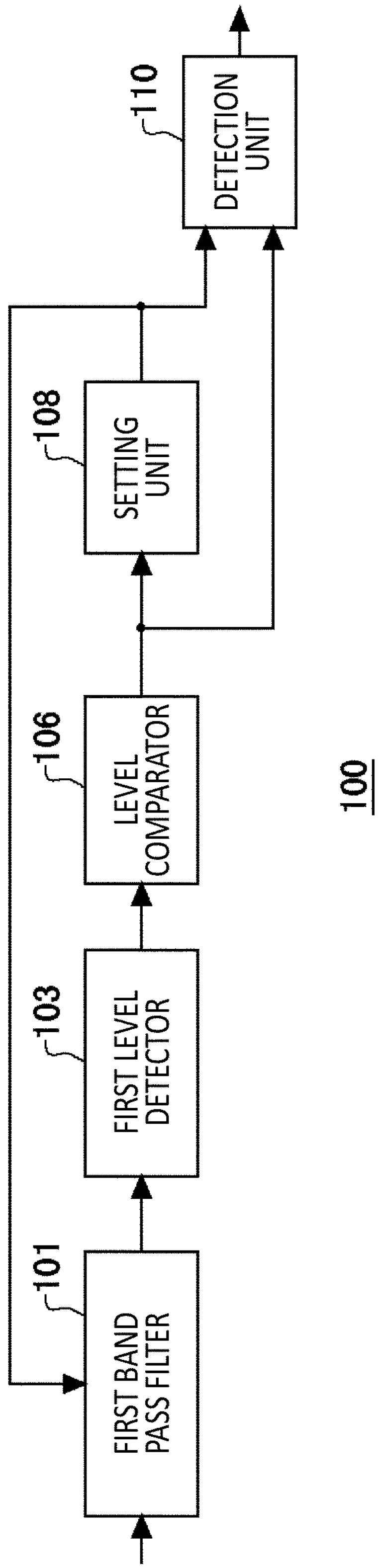
FIG. 6 is a diagram illustrating an example of functional blocks of a pattern detector according to a second embodiment.

FIG. 6 is an example of functional blocks of the pattern detector 100 according to a second embodiment. The pattern detector 100 according to the second embodiment is different from the pattern detector 100 including two band pass filters according to the first embodiment in that the first BPF 101 is provided as one band pass filter. Note that the pattern detector 100 according to the second embodiment may include two or more BPFs.

In the second embodiment, the level comparator 106 changes the set frequency of the first BPF 101 on the basis of the comparison result between the previous and current output levels of the first BPF 101. On the basis of the comparison result of the output levels of the first BPF 101 in different periods by the level comparator 106 and the setting history of the set frequency of the first BPF 101 in different periods by the setting unit 108, the detection unit 110 detects, from the voice signal, the formant frequency band including the first formant frequency at which the output level peaks. On the basis of the comparison result of the output levels of the first BPF 101 in at least three different periods by the level comparator 106, the setting history of the set frequency of the first BPF 101 in at least three periods by the setting unit 108, and the frequency characteristic of the first BPF 101, the detection unit 110 may detect the formant frequency band from the voice signal.

When a difference between the previous and current output levels of the frequency signals output from the first BPF 101 is smaller than the predetermined difference, the detection unit 110 may detect the formant frequency band on the basis of the comparison result group of the output levels, the setting history of the set frequency, and the frequency characteristic. When the difference between the previous and current output levels of the frequency signals output from the first BPF 101 is greater than or equal to the predetermined difference, the detection unit 110 does not need to detect the formant frequency band on the basis of the comparison result group of the output levels, the setting history of the set frequency, and the frequency characteristic.

Figure 7:
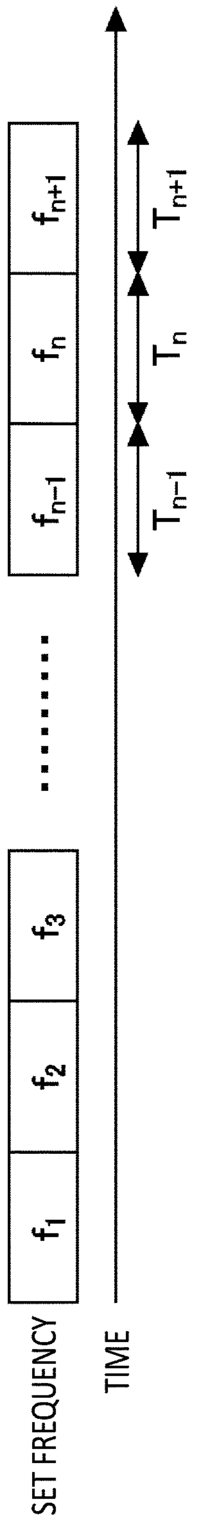
FIG. 7 is a diagram for explaining a set frequency.

As illustrated in FIG. 7, the first BPF 101 extracts and outputs a frequency signal in a desired frequency band from the voice signal while changing the set frequency f for each period T. The setting unit 108 sets the next set frequency of the first BPF 101 according to a condition table as illustrated in FIG. 8. That is, when the current set frequency is increased by 20% with respect to the previous set frequency (UP), and the current output level of the frequency signal S2 is higher than the previous output level of the frequency signal S1 (UP), the setting unit 108 decides to further increase the next set frequency by 20% (UP). When the current set frequency is increased by 20% (UP) from the previous set frequency, and the current output level of the frequency signal S2 is lower than the previous output level of the frequency signal S1 (DN), the setting unit 108 decides to decrease the next set frequency by 20% (DN).

In addition, when the current set frequency is decreased by 20% from the previous set frequency (DN), and the current output level of the frequency signal S2 is higher than the previous output level of the frequency signal S1 (UP), the setting unit 108 decides to further decrease the next set frequency by 20% (DN). When the current set frequency is decreased by 20% (DN) from the previous set frequency, and the current output level of the frequency signal S2 is lower than the previous output level of the frequency signal S1 (DN), the setting unit 108 decides to increase the next set frequency by 20% (UP).

According to the condition table as illustrated in FIG. 9, the detection unit 110 may determine whether the formant frequency band including the first formant frequency has been detected. That is, when the previous set frequency is higher than the second-previous set frequency, the previous output level of the first BPF 101 is higher than the second-previous output level of the first BPF 101, the current set frequency is higher than the previous set frequency, and the current output level of the first BPF 101 is lower than the previous output level of the first BPF 101, the detection unit 110 determines that there is peak detection, that is, the formant frequency band has been detected. When the previous set frequency is lower than the second-previous set frequency, the second-previous output level of the first BPF 101 is lower than the previous output level of the first BPF 101, the current set frequency is lower than the previous set frequency, and the current output level of the first BPF 101 is lower than the previous output level of the first BPF 101, the detection unit 110 determines that there is peak detection, that is, the formant frequency band has been detected.

For example, the first BPF 101 extracts the frequency signal S1 indicating the frequency component of the frequency band B1 including a set frequency $f_{n-1}$ from the voice signal of a period $T_{n-1}$. Next, the first BPF 101 extracts the frequency signal S2 indicating the frequency component of the frequency band B2 including a set frequency $f_n$, which is 20% higher than the set frequency $f_{n-1}$, from the voice signal in a period $T_n$. The level comparator 106 compares the previous output level of the frequency signal S1 derived by the first level detector 103 with the current output level of the frequency signal S2 to determine whether the current output level of the frequency signal S2 is higher or lower than the previous output level of the frequency signal S1. When the previous output level of the frequency signal S1 is lower than the current output level of the frequency signal S2, the setting unit 108 sets a next set frequency $f_{n+1}$ of the first BPF 101 to be higher than the current set frequency $f_n$ by 20%. Then, the first BPF 101 having the set frequency $f_{n+1}$ set extracts the frequency signal S3 indicating the frequency component of the frequency band B3 including the set frequency $f_{n+1}$ from the voice signal in a period $T_{n+1}$. When the output level of the frequency signal S2 is higher than the output level of the frequency signal S3, the detection unit 110 detects, as the formant frequency band, a frequency band between a common frequency $fc_n$ having the same gain between the frequency characteristic of the first BPF 101 set to the set frequency $f_{n-1}$ and the frequency characteristic of the first BPF 101 set to the set frequency $f_n$ and a common frequency $fc_{n+1}$ having the same gain between the frequency characteristic of the first BPF 101 set to the set frequency $f_n$ and the frequency characteristic of the first BPF 101 set to the set frequency $f_{n+1}$.

Alternatively, the first BPF 101 extracts the frequency signal S1 indicating the frequency component of the frequency band B1 including the set frequency $f_{n-1}$ from the voice signal of the period $T_{n-1}$. Herein, in a case where the setting unit 108 has decreased the previous set frequency by 20%, when the output level of the frequency signal S1 is higher than the second-previous output level of a frequency signal S0, the setting unit 108 sets the set frequency $f_n$ of the period $T_n$ to the set frequency lower than the set frequency $f_{n-1}$ by 20%. Then, the first BPF 101 extracts the frequency signal S2 indicating the frequency component of the frequency band B2 including the set frequency $f_n$ from the voice signal of the period $T_n$. Next, when the output level of the frequency signal S1 is lower than the output level of the frequency signal S2, the setting unit 108 sets the set frequency $f_{n+1}$ of the period $T_{n+1}$ to a set frequency lower than the set frequency $f_n$ by 20%. Then, the first BPF 101 extracts the frequency signal S3 indicating the frequency component of the frequency band B3 including the set frequency $f_{n+1}$ from the voice signal in the period $T_{n+1}$. When the output level of the frequency signal S2 is higher than the output level of the frequency signal S3, the detection unit 110 detects, as the formant frequency band, the frequency band between the common frequency $fc_n$ having the same gain between the frequency characteristic of the first BPF 101 set to the set frequency $f_{n-1}$ and the frequency characteristic of the first BPF 101 set to the set frequency $f_n$ and the common frequency $fc_{n+1}$ having the same gain between the frequency characteristic of the first BPF 101 set to the set frequency $f_n$ and the frequency characteristic of the first BPF 101 set to the set frequency $f_{n+1}$.

Figure 10:
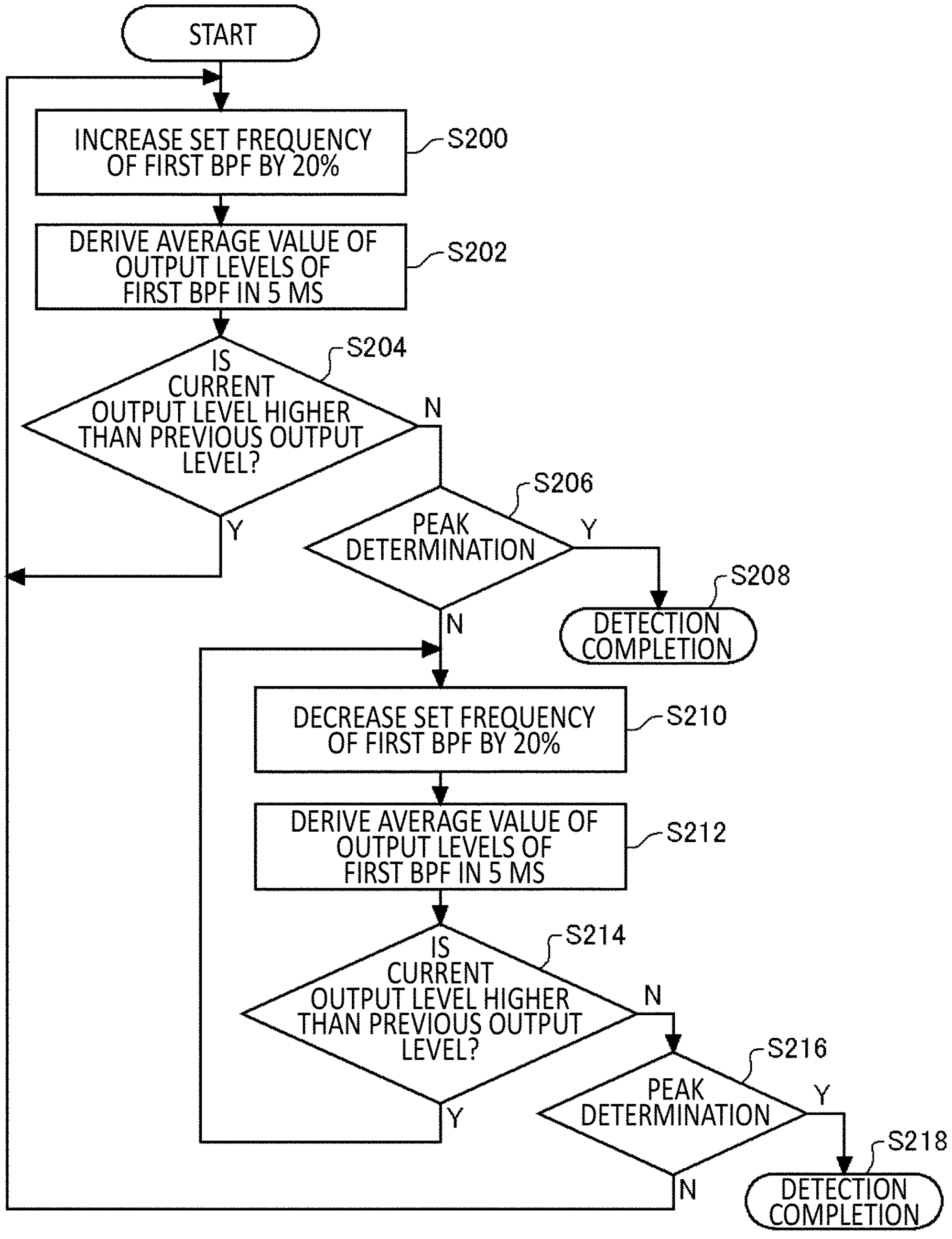
FIG. 10 is a flowchart illustrating an example of a procedure of detecting the formant frequency band by the first BPF in the second embodiment.

FIG. 10 is a flowchart illustrating an example of a procedure for setting a set frequency of the first BPF 101 according to the second embodiment.

The setting unit 108 increases the set frequency of the first BPF 101 by 20% (S200). The first level detector 103 derives an average value of the output levels of the first frequency signal output from the first BPF 101 in 5 ms (S202). The level comparator 106 determines whether the current output level of the first BPF 101 is higher or lower than the previous output level of the first BPF 101 (S204).

When the current output level of the first BPF 101 is higher than the previous output level of the first BPF 101, the setting unit 108 increases the set frequency of the first BPF 101 by 20% again (S200).

On the other hand, when the current output level of the first BPF 101 is lower than the previous output level of the first BPF 101, the detection unit 110 performs the peak determination of the voice signal on the basis of the comparison result of the output levels of the first BPF 101 in different periods by the level comparator 106, the setting history of the set frequency of the first BPF 101 in different periods by the setting unit 108, and the frequency characteristic of the first BPF 101 (S206).

When the second-previous output level of the first BPF 101 is lower than the previous output level of the first BPF 101, and the current output level of the first BPF 101 is lower than the previous output level of the first BPF 101, the detection unit 110 detects, as the formant frequency band, a frequency band between a common frequency having the same gain between the frequency characteristic of the first BPF 101 set to the second-previous set frequency and the frequency characteristic of the first BPF 101 set to the previous set frequency and a common frequency having the same gain between the frequency characteristic of the first BPF 101 set to the previous set frequency and the frequency characteristic of the first BPF 101 set to the current set frequency, and completes the detection processing (S208).

When detection unit 110 fails to detect the peak of the voice signal, the setting unit 108 decreases the set frequency of the first BPF 101 by 20% (S210). The first level detector 103 derives an average value of the output levels of the first frequency signal output from the first BPF 101 in 5 ms (S212).

The level comparator 106 determines whether the current output level of the first BPF 101 is higher or lower than the previous output level of the first BPF 101 (S214). When the current output level of the first BPF 101 is higher than the previous output level of the first BPF 101, the setting unit 108 decreases the set frequency of the first BPF 101 by 20% again (S210). On the other hand, when the current output level of the first BPF 101 is lower than the previous output level of the first BPF 101, the detection unit 110 performs the peak determination of the voice signal on the basis of the comparison result of the output levels of the first BPF 101 in different periods by the level comparator 106, the setting history of the set frequency of the first BPF 101 in different periods by the setting unit 108, and the frequency characteristic of the first BPF 101 (S216). When the second-previous output level of the first BPF 101 is lower than the previous output level of the first BPF 101, and the current output level of the first BPF 101 is lower than the previous output level of the first BPF 101, the detection unit 110 detects, as the formant frequency band, a frequency band between a common frequency having the same gain between the frequency characteristic of the first BPF 101 set to the second-previous set frequency and the frequency characteristic of the first BPF 101 set to the previous set frequency and a common frequency having the same gain between the frequency characteristic of the first BPF 101 set to the previous set frequency and the frequency characteristic of the first BPF 101 set to the current set frequency, and completes the detection processing (S218). When detection unit 110 fails to detect the peak of the voice signal, the setting unit 108 increases the set frequency of the first BPF 101 by 20% (S200).

According to the second embodiment, when the pattern detector 100 repeats the above processing, the setting unit 108 can set the set frequency of the first BPF 101 such that the first BPF 101 can extract, from the voice signal, the frequency signal in the frequency band near the formant frequency at which the output level peaks.

The detection unit 110 can compare the previous output level of the frequency signal with the current output level of the frequency signal while changing the set frequency of the first BPF 101, and detect, from the voice signal, the formant frequency band including the first formant frequency at which the output level peaks. By using one band pass filter, the pattern detector 100 can detect, from the voice signal, the formant frequency band including the first formant frequency at which the output level peaks.

By sequentially recording the formant frequency band including the first formant frequency at which the output level peaks, the detection unit 110 can record the temporal change pattern of the formant frequency band including the first formant frequency in the voice signal. That is, according to the pattern detector 100 according to the second embodiment, it is possible to detect the temporal change pattern of the formant frequency band including the first formant frequency by using one BPF, and to realize reduction in the number of components of the pattern detector 100, reduction in power consumption, cost reduction, and the like.

Figure 11:
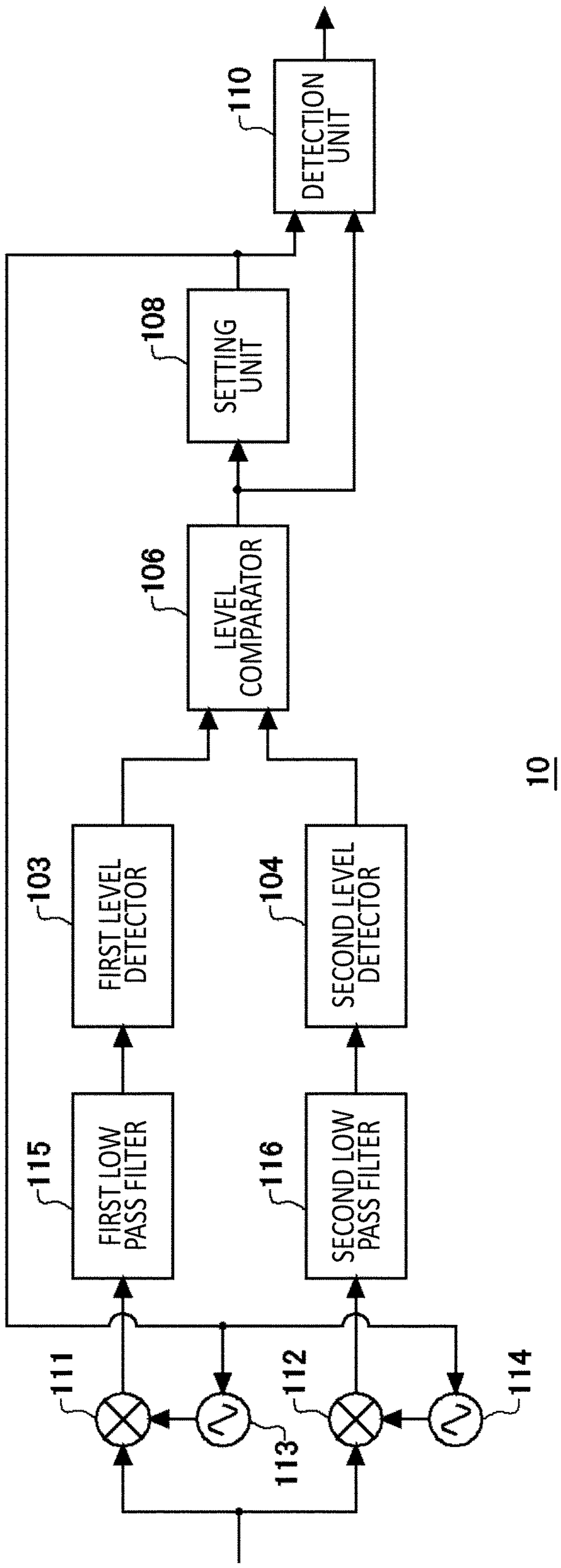
FIG. 11 is a diagram illustrating an example of functional blocks of a pattern detector according to a third embodiment.

FIG. 11 is a diagram illustrating an example of functional blocks of a wake word detector 10 according to a third embodiment. The wake word detector 10 according to the third embodiment includes a first mixer 111, a first variable frequency oscillator 113, and a first low pass filter (first LPF) 115 instead of the first BPF 101, and includes a second mixer 112, a second variable frequency oscillator 114, and a second LPF 116 instead of the second BPF 102.

The first variable frequency oscillator 113 oscillates a frequency signal corresponding to a set frequency $f_{LO1}$ set by the setting unit 108. The second variable frequency oscillator 114 oscillates a frequency signal corresponding to a set frequency $f_{LO2}$ set by the setting unit 108.

The first mixer 111 outputs a first frequency signal indicating each of the sum and difference of the frequencies of the frequency signal S1 and the voice signal Vin in response to the input of the frequency signal S1 oscillated from the first variable frequency oscillator 113 and the voice signal Vin. The first LPF 115 cuts off, from the first frequency signal, a frequency signal in a frequency band higher than a predetermined frequency band, and outputs a first intermediate frequency signal indicating a difference between the frequency signal and the voice signal.

For example, when the voice signal $Vin=A\times\cos(2\pi\times f_{in}\times t)$ and the frequency signal having the set frequency $f_{LO1}$ are input to the first mixer 111, the first LPF 115 outputs the first intermediate frequency signal $V_{out1}=(2/\pi)\times A\times\cos(2\pi\times(f_{in}-f_{Lo1})\times t)$.

The second mixer 112 outputs a second frequency signal indicating each of the sum and difference of the frequencies of the frequency signal S2 and the voice signal Vin in response to the input of the frequency signal S2 oscillated from the second variable frequency oscillator 114 and the voice signal Vin. The second LPF 116 cuts off, from the second frequency signal, a frequency signal in a frequency band higher than a predetermined frequency band, and outputs a second intermediate frequency signal indicating a difference between the frequency signal and the voice signal. For example, when the voice signal $Vin=A\times\cos(2\pi\times f_{in}\times t)$ and the frequency signal having the set frequency $f_{LO2}$ are input to the second mixer 112, the second LPF 116 outputs the second intermediate frequency signal $V_{out2}=(2/\pi)\times A\times\cos(2\pi\times(f_{in}-f_{Lo2})\times t)$. Herein, A is a constant, and t is time. The set frequency $f_{LO1}$ is lower than the set frequency $f_{LO2}$.

The setting unit 108 sets the set frequency of each of the first variable frequency oscillator 113 and the second variable frequency oscillator 114 on the basis of the comparison result of the output levels of the intermediate frequency signals of the first mixer 111 and the second mixer 112. The detection unit 110 detects the formant frequency band including the first formant frequency in the voice signal on the basis of the comparison result of the output levels of the intermediate frequency signals of the first mixer 111 and the second mixer 112 and the setting history of the set frequency of each of the first variable frequency oscillator 113 and the second variable frequency oscillator 114 by the setting unit 108. The setting history of the set frequency indicates the setting history of the set frequency of each of the first variable frequency oscillator 113 and the second variable frequency oscillator 114 by the setting unit 108. The setting history may indicate the second-previous, previous, and current set frequencies of each of the first variable frequency oscillator 113 and the second variable frequency oscillator 114 by the setting unit 108. The setting history may be a flag indicating whether the current set frequencies of the first variable frequency oscillator 113 and the second variable frequency oscillator 114 by the setting unit 108 are lower or higher than the previous set frequencies.

When the output level of the first intermediate frequency signal $V_{out1}$ is lower than the output level of the second intermediate frequency signal $V_{out2}$, the setting unit 108 sets the oscillation frequency of the first variable frequency oscillator 113 to a set frequency $f_{Lo1(2)}$ higher than the set frequency $f_{Lo1(1)}$, and sets the oscillation frequency of the second variable frequency oscillator 114 to a set frequency $f_{Lo2(2)}$ higher than the set frequency $f_{Lo2(1)}$.

The first variable frequency oscillator 113 of which the oscillation frequency is set to the set frequency $f_{Lo1(2)}$ by the setting unit 108 oscillates the frequency signal S3. The first mixer 111 receives the input of the frequency signal S3 and the voice signal Vin, and outputs a third frequency signal indicating each of the sum and difference of the frequencies of the frequency signal S3 and the voice signal Vin. The first LPF 115 cuts off, from the third frequency signal, a frequency signal in a frequency band higher than a predetermined frequency band, and outputs a third intermediate frequency signal indicating a difference between the frequency signal and the voice signal.

The second variable frequency oscillator 114 of which the oscillation frequency is set to the set frequency $f_{Lo2(2)}$ by the setting unit 108 oscillates the frequency signal S4. The second mixer 112 receives the input of the frequency signal S4 and the voice signal Vin, and outputs a fourth frequency signal indicating each of the sum and difference of the frequencies of the frequency signal S4 and the voice signal Vin. The second LPF 116 cuts off, from the fourth frequency signal, a frequency signal in a frequency band higher than a predetermined frequency band, and outputs a fourth intermediate frequency signal indicating a difference between the frequency signal and the voice signal. The level comparator 106 determines whether the output level of the fourth intermediate frequency is higher or lower than the output level of the third intermediate frequency signal.

Figure 12A:
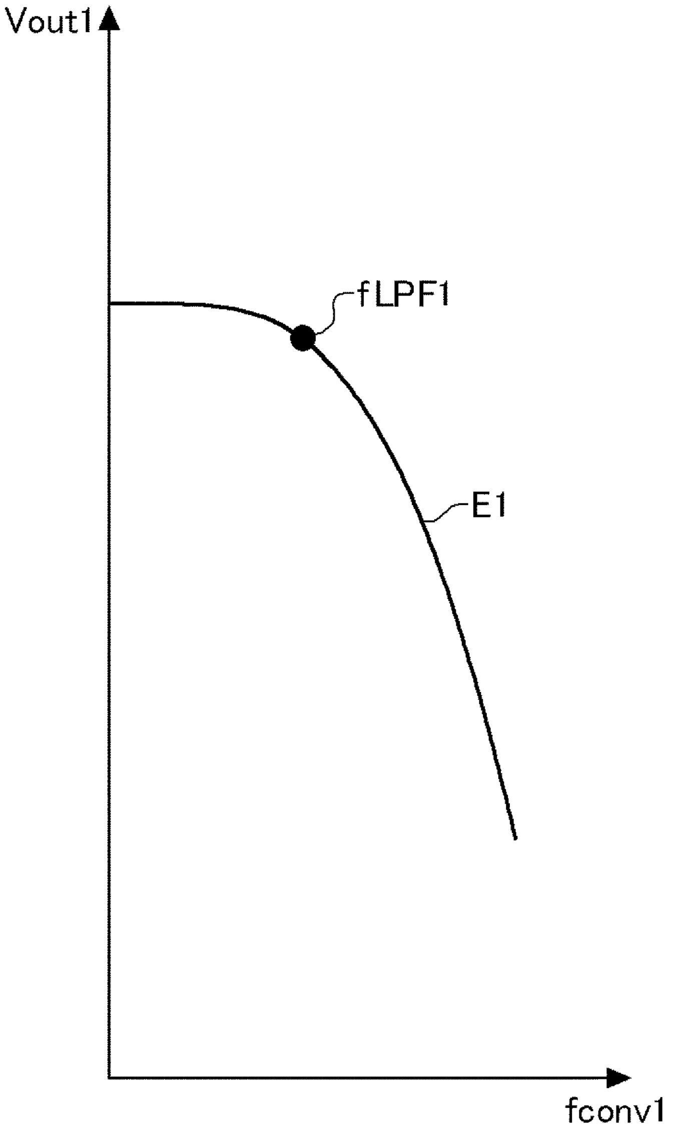
FIG. 12A is a diagram for explaining a cross point frequency in the pattern detector according to the third embodiment.
Figure 12B:
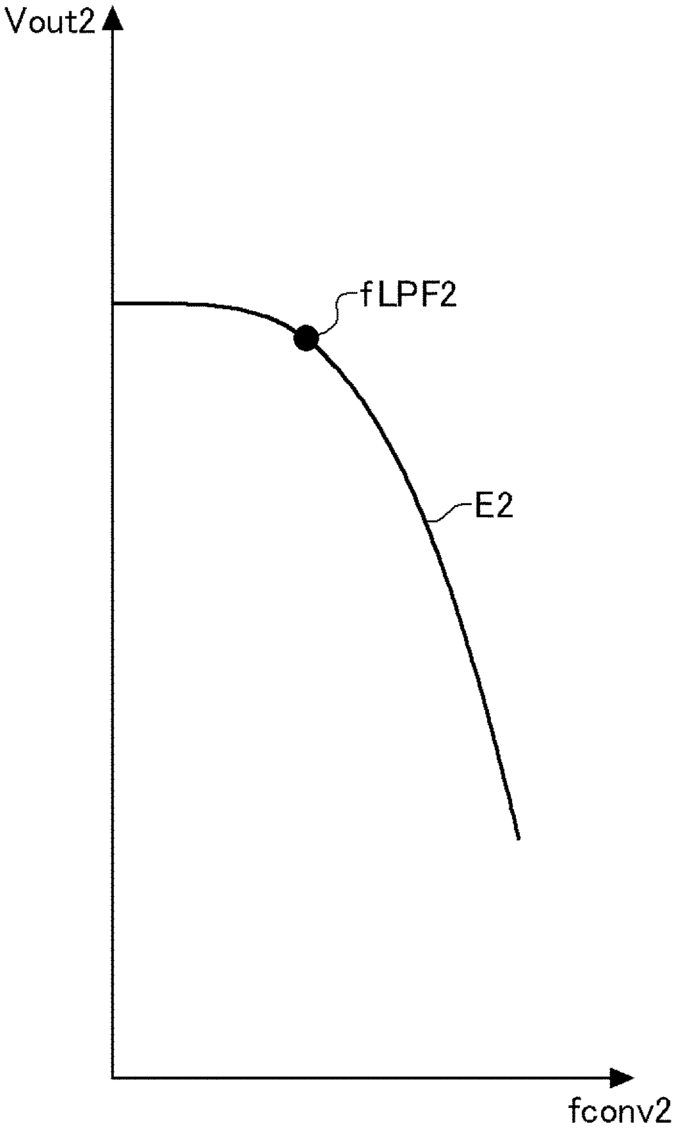
FIG. 12B is a diagram for explaining the cross point frequency in the pattern detector according to the third embodiment.

Herein, as illustrated in FIG. 12A, when the cutoff frequency of the first LPF 115 is fLPF1 on a frequency fconv1 axis of the frequency signal output from the first mixer 111, the frequency characteristic of the first LPF 115 can be expressed by a transfer function D1 called GLPF(fLPF1, fconv1). As illustrated in FIG. 12B, when the cutoff frequency of the second LPF 116 is fLPF2 on a frequency fconv2 axis of the frequency signal output from the second mixer 112, the frequency characteristic of the second LPF 116 can be expressed by a transfer function D2 called GLPF(fLPF2, fconv2). Normally, fLPF1 and the fLPF2 are designed such that the sum of fLPF1 and fLPF2 is a value smaller than a difference between the set frequency $f_{Lo1}$ and the set frequency $f_{Lo2}$ in order that a band is divided in the frequency characteristics viewed up to the intermediate frequency signals $V_{out1}$ and $V_{out2}$.

Figure 13:
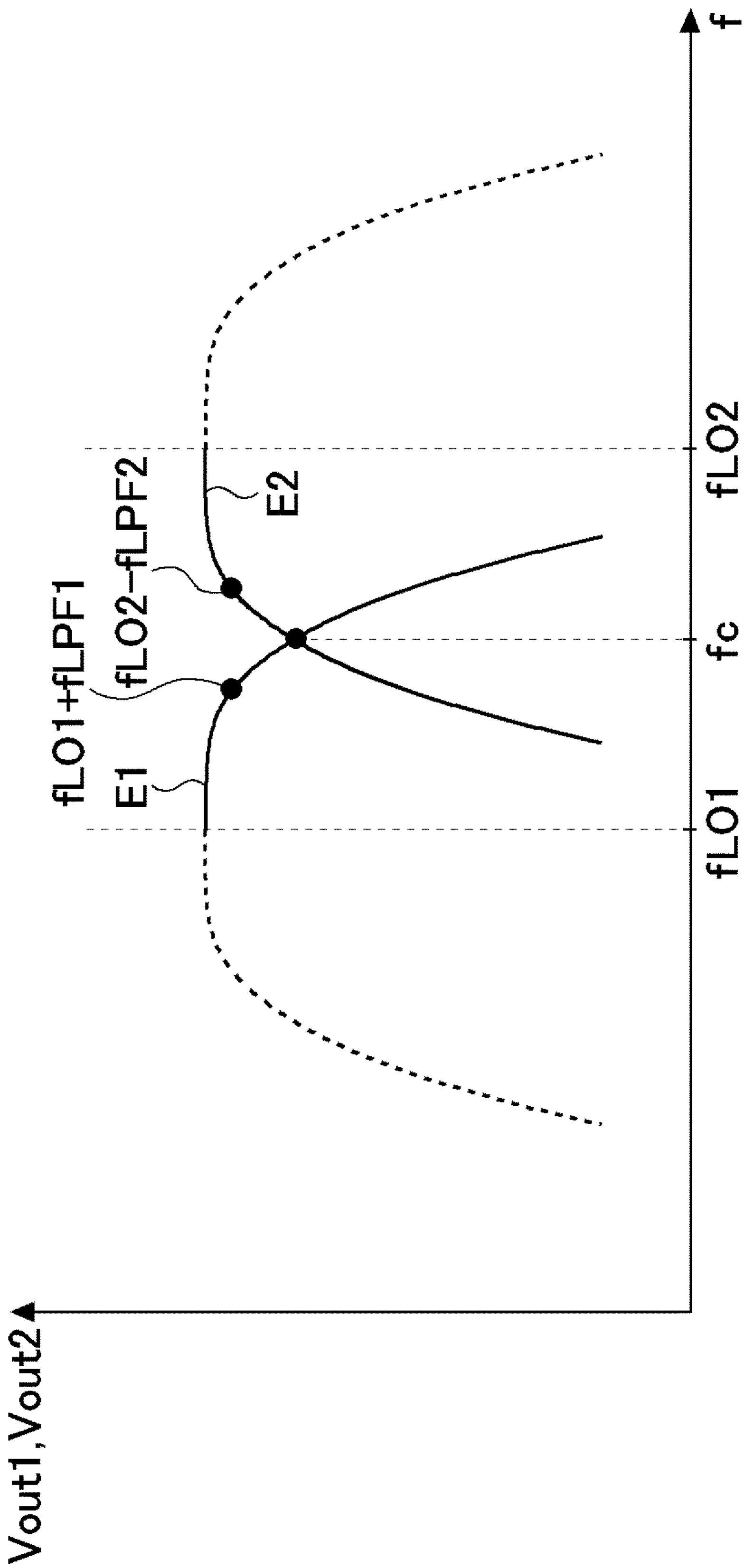
FIG. 13 is a diagram for explaining the cross point frequency in the pattern detector according to the third embodiment.

When the frequency characteristics from the input to the intermediate frequency signals $V_{out1}$ and $V_{out2}$ are expressed on the frequency f axis of the input signal, as illustrated in FIG. 13, two band paths (two transfer functions) appear to be arranged. In FIG. 13, a transfer function E1 indicates the frequency characteristic of $V_{out1}$ with respect to the frequency f of the input signal higher than the set frequency $f_{Lo1}$ when $V_{out1}$ is viewed from the input. A transfer function E2 indicates the frequency characteristic of $V_{out2}$ with respect to the frequency f of the input signal lower than the set frequency $f_{Lo2}$ when $V_{out2}$ is viewed from the input.

In the frequency f, when focusing on a frequency band between the set frequency $f_{Lo1}$ and the set frequency $f_{Lo2}$, $V_{out1}$ can be converted into fconv1=f−$f_{Lo1}$. Therefore, it can be expressed that $V_{out1}$=K1×Vin×GLPF1(fLPF1, (f−$f_{Lo1}$)) K1 represents a conversion coefficient of the first mixer 111. $V_{out2}$ can be converted into fconv1=f−$f_{Lo2}$. Therefore, it can be expressed that $V_{out2}$=K2×Vin×GLPF2(fLPF2, (f−$f_{Lo2}$)). K2 represents a conversion coefficient of the second mixer 112.

The cross point frequency fc is a frequency f satisfying $V_{out1}$=$V_{out2}$. Therefore, the detection unit 110 can detect the cross point frequency fc by deriving the frequency f satisfying K1×Vin×GLPF1(fLPF1, (f−$f_{Lo1}$))=K2×Vin×GLPF2 (fLPF2, (f−$f_{Lo2}$)) That is, the detection unit 110 can detect the cross point frequency fc on the basis of the GLPF 1 indicating the transfer function E1 of the first LPF 115, the GLPF 2 indicating the transfer function E2 of the second LPF 116, $f_{Lo1}$ and $f_{Lo2}$, and conversion coefficients K1 and K2. The detection unit 110 detects, as the formant frequency band, a frequency band between a common frequency, at which a gain in a case where the transfer function GLPF1 based on the frequency characteristic of the first LPF 115 when the oscillation frequency of the first variable frequency oscillator 113 is set to the set frequency $f_{Lo1(1)}$ is multiplied by the conversion coefficient K1 of the first mixer 111 and a gain in a case where the transfer function GLPF2 based on the frequency characteristic of the second LPF 116 when the oscillation frequency of the second variable frequency oscillator 114 is set to the set frequency $f_{Lo2(1)}$ is multiplied by the conversion coefficient K2 of the second mixer 112 are the same, and a common frequency, at which a gain in a case where the transfer function GLPF1 based on the frequency characteristic of the first LPF 115 when the oscillation frequency of the first variable frequency oscillator 113 is set to the set frequency $f_{Lo1(2)}$ is multiplied by the conversion coefficient K1 and a gain in a case where the transfer function GLPF2 based on the frequency characteristic of the second LPF 116 when the oscillation frequency of the second variable frequency oscillator 114 is set to the set frequency $f_{Lo2(2)}$ is multiplied by the conversion coefficient K2 is the same.

In this regard, when the output level of the fourth intermediate frequency signal is lower than that of the third intermediate frequency signal, K1=K2 is satisfied in a mixer designed to be able to perform normally, and thus, the detection unit 110 detects, as the formant frequency band, a frequency band between a common frequency having the same gain between the transfer function GLPF1 based on the frequency characteristic of the first LPF 115 when the oscillation frequency of the first variable frequency oscillator 113 is set to the set frequency $f_{Lo1(1)}$ and the transfer function GLPF2 based on the frequency characteristic of the second LPF 116 when the oscillation frequency of the second variable frequency oscillator 114 is set to the set frequency $f_{Lo2(1)}$, and a common frequency having the same gain between the transfer function GLPF1 based on the frequency characteristic of the first LPF 115 when the oscillation frequency of the first variable frequency oscillator 113 is set to the set frequency $f_{Lo1(2)}$ and the transfer function GLPF2 based on the frequency characteristic of the second LPF 116 when the oscillation frequency of the second variable frequency oscillator 114 is set to the set frequency $f_{Lo2(2)}$.

On the other hand, when the output level of the first intermediate frequency signal $V_{out1}$ is higher than the output level of the second intermediate frequency signal $V_{out2}$, the setting unit 108 sets the oscillation frequency of the first variable frequency oscillator 113 to the set frequency $f_{Lo1(2)}$ lower than the set frequency $f_{Lo1(1)}$, and sets the oscillation frequency of the second variable frequency oscillator 114 to the set frequency $f_{Lo2(2)}$ lower than the set frequency $f_{Lo2(1)}$ and higher than the set frequency $f_{Lo1(2)}$.

The first variable frequency oscillator 113 of which the oscillation frequency is set to the set frequency $f_{Lo1(2)}$ by the setting unit 108 oscillates the frequency signal S3. The first mixer 111 receives the input of the frequency signal S3 and the voice signal Vin, and outputs a third frequency signal indicating each of the sum and difference of the frequencies of the frequency signal S3 and the voice signal Vin. The first LPF 115 cuts off, from the third frequency signal, a frequency signal in a frequency band higher than a predetermined frequency band, and outputs a third intermediate frequency signal indicating a difference between the frequency signal and the voice signal.

The second variable frequency oscillator 114 of which the oscillation frequency is set to the set frequency $f_{Lo2(2)}$ by the setting unit 108 oscillates the frequency signal S4. The second mixer 112 receives the input of the frequency signal S4 and the voice signal Vin, and outputs a fourth frequency signal indicating each of the sum and difference of the frequencies of the frequency signal S4 and the voice signal Vin. The second LPF 116 cuts off, from the fourth frequency signal, a frequency signal in a frequency band higher than a predetermined frequency band, and outputs a fourth intermediate frequency signal indicating a difference between the frequency signal and the voice signal.

The level comparator 106 determines whether the output level of the fourth intermediate frequency is higher or lower than the output level of the third intermediate frequency signal. When the output level of the fourth intermediate frequency signal is higher than that of the third intermediate frequency signal, K1=K2 is satisfied in a mixer designed to be able to perform normally, and thus, the detection unit 110 detects, as the formant frequency band, a frequency band between a common frequency having the same gain between the transfer function GLPF1 based on the frequency characteristic of the first LPF 115 when the oscillation frequency of the first variable frequency oscillator 113 is set to the set frequency $f_{Lo1(1)}$ and the transfer function GLPF2 based on the frequency characteristic of the second LPF 116 when the oscillation frequency of the second variable frequency oscillator 114 is set to the set frequency $f_{Lo2(1)}$, and a common frequency having the same gain between the transfer function GLPF1 based on the frequency characteristic of the first LPF 115 when the oscillation frequency of the first variable frequency oscillator 113 is set to the set frequency $f_{Lo1(2)}$ and the transfer function GLPF2 based on the frequency characteristic of the second LPF 116 when the oscillation frequency of the second variable frequency oscillator 114 is set to the set frequency $f_{Lo2(2)}$.

As described above, according to the third embodiment, similarly to the first embodiment, it is possible to detect, from the voice signal, the formant frequency band including the first formant frequency at which the output level peaks while changing the set frequencies of the first variable frequency oscillator 113 and the second variable frequency oscillator 114.

For example, by setting the set frequency of the first variable frequency oscillator 113 to 600 Hz and providing the first LPF 115 of 50 Hz at the subsequent stage of the first mixer 111, it is possible to realize the same function as the first BPF 101 which is set to 600 Hz as the center frequency and outputs a frequency signal of ±50 Hz around 600 Hz. In addition, by setting the set frequency of the second variable frequency oscillator 114 to 720 Hz and providing the second LPF 116 of 50 Hz at the subsequent stage of the second mixer 112, it is possible to realize the same function as the second BPF 102 which is set to 720 Hz as the center frequency and outputs a frequency signal of ±50 Hz around 720 Hz. Note that high frequency may be cut by slowing down the fast responsiveness of the first mixer 111 and the second mixer 112 to limit the frequency bands output from the first mixer 111 and the second mixer 112. This eliminates the need to provide the first LPF 115 and the second LPF 116 at the subsequent stage of the first mixer 111 and the second mixer 112.

While the present invention has been described with the embodiments, the technical scope of the present invention is not limited to the above-described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: wake word detector;
100: pattern detector;
101: first BPF;
102: second BPF;
103: first level detector;
104: second level detector;
106: level comparator;
108: setting unit;
110: detection unit;
111: first mixer;
112: second mixer;
113: first variable frequency oscillator;
114: second variable frequency oscillator;
130: pattern data storage unit; and
150: collation unit.

What is claimed is:

1. A sound wave signal processing apparatus comprising:
an extraction unit configured to extract, from a sound wave signal, a plurality of frequency signals indicating respective frequency components of a plurality of frequency bands including different set frequencies;
a setting unit configured to set a set frequency of the extraction unit on a basis of a comparison result between output levels of the frequency signals of the different set frequencies extracted by the extraction unit; and
a detection unit configured to detect a formant frequency band including a formant frequency in the sound wave signal on a basis of a comparison result group between the output levels of the frequency signals of the different set frequencies extracted by the extraction unit, a setting history of the set frequency of the extraction unit by the setting unit, and a frequency characteristic of the extraction unit.

2. A sound wave signal processing apparatus comprising:
an extraction unit configured to extract, from a sound wave signal, a plurality of frequency signals indicating respective frequency components of a plurality of frequency bands including different set frequencies;
a setting unit configured to set a set frequency of the extraction unit on a basis of a comparison result between output levels of the frequency signals of the different set frequencies extracted by the extraction unit; and
a detection unit configured to detect, when a difference between output levels of frequency signals of two set frequencies extracted by the extraction unit is smaller than a predetermined difference, a formant frequency band including a formant frequency in the sound wave signal on a basis of a set frequency having a higher output level of the output levels of the frequency signals of the two set frequencies extracted by the extraction unit.

3. The sound wave signal processing apparatus according to claim 1, wherein the detection unit is configured to, when a difference between output levels of frequency signals of two set frequencies extracted by the extraction unit is smaller than a predetermined difference, detect the formant frequency band on a basis of a set frequency having a higher output level of the output levels of the frequency signals of the two set frequencies extracted by the extraction unit.

4. The sound wave signal processing apparatus according to claim 1, wherein
the extraction unit is configured to extract, from the sound wave signal, a first frequency signal indicating a frequency component of a first frequency band including a first set frequency set by the setting unit and a second frequency signal indicating a frequency component of a second frequency band including a second set frequency higher than the first set frequency set by the setting unit,
the extraction unit is configured to, when an output level of the first frequency signal is lower than an output level of the second frequency signal, extract, from the sound wave signal, a third frequency signal indicating a frequency component of a third frequency band including a third set frequency higher than the second set frequency set by the setting unit, and
the detection unit is configured to, when the output level of the second frequency signal is higher than an output level of the third frequency signal, detect the formant frequency band on a basis of the second set frequency.

5. The sound wave signal processing apparatus according to claim 1, wherein
the extraction unit is configured to extract, from the sound wave signal, a first frequency signal indicating a frequency component of a first frequency band including a first set frequency set by the setting unit and a second frequency signal indicating a frequency component of a second frequency band including a second set frequency lower than the first set frequency set by the setting unit,
the extraction unit is configured to, when an output level of the first frequency signal is lower than an output level of the second frequency signal, extract, from the sound wave signal, a third frequency signal indicating a frequency component of a third frequency band including a third set frequency lower than the second set frequency set by the setting unit, and the detection unit is configured to, when the output level of the second frequency signal is higher than an output level of the third frequency signal, detect the formant frequency band on a basis of the second set frequency.

6. The sound wave signal processing apparatus according to claim 1, wherein the extraction unit includes a first band pass filter and a second band pass filter capable of changing a set frequency, the setting unit is configured to set a set frequency of each of the first band pass filter and the second band pass filter on a basis of a comparison result of output levels of frequency signals output from the first band pass filter and the second band pass filter, and the detection unit is configured to detect the formant frequency band on a basis of a comparison result group of the output levels of the frequency signals output from the first band pass filter and the second band pass filter, a setting history of the set frequency of each of the first band pass filter and the second band pass filter by the setting unit, and a frequency characteristic of each of the first band pass filter and the second band pass filter.

7. The sound wave signal processing apparatus according to claim 6, wherein the first band pass filter of which the set frequency is set to a first set frequency by the setting unit is configured to extract, from the sound wave signal, a first frequency signal indicating a frequency component of a first frequency band including the first set frequency, the second band pass filter of which the set frequency is set to a second set frequency higher than the first set frequency by the setting unit is configured to extract, from the sound wave signal, a second frequency signal indicating a frequency component of a second frequency band including the second set frequency, the setting unit is configured to, when an output level of the first frequency signal is lower than an output level of the second frequency signal, set the set frequency of the first band pass filter to a third set frequency higher than the first set frequency and set the set frequency of the second band pass filter to a fourth set frequency higher than the second set frequency and the third set frequency, the first band pass filter of which the set frequency is set to the third set frequency by the setting unit is configured to extract, from the sound wave signal, a third frequency signal indicating a frequency component of a third frequency band including the third set frequency, the second band pass filter of which the set frequency is set to the fourth set frequency by the setting unit is configured to extract, from the sound wave signal, a fourth frequency signal indicating a frequency component of a fourth frequency band including the fourth set frequency, and the detection unit is configured to, when an output level of the fourth frequency signal is lower than an output level of the third frequency signal, detect, as the formant frequency band, a frequency band between a common frequency having a same gain between the frequency characteristic of the first band pass filter set to the first set frequency and the frequency characteristic of the second band pass filter set to the second set frequency, and a common frequency having a same gain between the frequency characteristic of the first band pass filter set to the third set frequency and the frequency characteristic of the second band pass filter set to the fourth set frequency.

8. The sound wave signal processing apparatus according to claim 6, wherein the first band pass filter of which the set frequency is set to a first set frequency by the setting unit is configured to extract, from the sound wave signal, a first frequency signal indicating a frequency component of a first frequency band including the first set frequency, the second band pass filter of which the set frequency is set to a second set frequency higher than the first set frequency by the setting unit is configured to extract, from the sound wave signal, a second frequency signal indicating a frequency component of a second frequency band including the second set frequency, the setting unit is configured to, when an output level of the first frequency signal is higher than an output level of the second frequency signal, set the set frequency of the first band pass filter to a third set frequency lower than the first set frequency and set the set frequency of the second band pass filter to a fourth set frequency lower than the second set frequency and higher than the third set frequency, the first band pass filter of which the set frequency is set to the third set frequency by the setting unit is configured to extract, from the sound wave signal, a third frequency signal indicating a frequency component of a third frequency band including the third set frequency, the second band pass filter of which the set frequency is set to the fourth set frequency by the setting unit is configured to extract, from the sound wave signal, a fourth frequency signal indicating a frequency component of a fourth frequency band including the fourth set frequency, and the detection unit is configured to, when an output level of the fourth frequency signal is higher than an output level of the third frequency signal, detect, as the formant frequency band, a frequency band between a common frequency having a same gain between the frequency characteristic of the first band pass filter set to the first set frequency and the frequency characteristic of the second band pass filter set to the second set frequency, and a common frequency having a same gain between the frequency characteristic of the first band pass filter set to the third set frequency and the frequency characteristic of the second band pass filter set to the fourth set frequency.

9. The sound wave signal processing apparatus according to claim 1, wherein the extraction unit includes a band pass filter capable of changing a set frequency, the setting unit is configured to set a set frequency of the band pass filter on a basis of a comparison result between output levels of frequency signals, which are output from the band pass filter, in different periods, and the detection unit is configured to detect the formant frequency band on a basis of a comparison result group between the output levels of the frequency signals, which are output from the band pass filter, in the different periods, a setting history of the set frequency of the band pass filter in the different periods by the setting unit, and a frequency characteristic of the band pass filter.

10. The sound wave signal processing apparatus according to claim 9, wherein the band pass filter of which the set frequency is set to a first set frequency by the setting unit is configured to extract, from a sound wave signal in a first period, a first frequency signal indicating a frequency component of a first frequency band including the first set frequency, the band pass filter of which the set frequency is set to a second set frequency higher than the first set frequency by the setting unit is configured to extract, from a sound wave signal in a second period, a second frequency signal indicating a frequency component of a second frequency band including the second set frequency, the setting unit is configured to, when an output level of the first frequency signal is lower than an output level of the second frequency signal, set the set frequency of the band pass filter to a third set frequency higher than the second set frequency, the band pass filter of which the set frequency is set to the third set frequency by the setting unit is configured to extract, from a sound wave signal in a third period, a third frequency signal indicating a frequency component of a third frequency band including the third set frequency, and the detection unit is configured to, when the output level of the second frequency signal is higher than an output level of the third frequency signal, detect, as the formant frequency band, a frequency band between a common frequency having a same gain between the frequency characteristic of the band pass filter set to the first set frequency and the frequency characteristic of the band pass filter set to the second set frequency, and a common frequency having a same gain between the frequency characteristic of the band pass filter set to the second set frequency and the frequency characteristic of the band pass filter set to the third set frequency.

11. The sound wave signal processing apparatus according to claim 9, wherein the band pass filter of which the set frequency is set to a first set frequency by the setting unit is configured to extract, from a sound wave signal in a first period, a first frequency signal indicating a frequency component of a first frequency band including the first set frequency, the band pass filter of which the set frequency is set to a second set frequency lower than the first set frequency by the setting unit is configured to extract, from a sound wave signal in a second period, a second frequency signal indicating a frequency component of a second frequency band including the second set frequency, the setting unit is configured to, when an output level of the first frequency signal is lower than an output level of the second frequency signal, set the set frequency of the band pass filter to a third set frequency lower than the second set frequency, the band pass filter of which the set frequency is set to the third set frequency by the setting unit is configured to extract, from a sound wave signal in a third period, a third frequency signal indicating a frequency component of a third frequency band including the third set frequency, and the detection unit is configured to, when the output level of the second frequency signal is higher than an output level of the third frequency signal, detect, as the formant frequency band, a frequency band between a common frequency having a same gain between the frequency characteristic of the band pass filter set to the first set frequency and the frequency characteristic of the band pass filter set to the second set frequency, and a common frequency having a same gain between the frequency characteristic of the band pass filter set to the second set frequency and the frequency characteristic of the band pass filter set to the third set frequency.

12. The sound wave signal processing apparatus according to claim 1, wherein the extraction unit includes:

a first variable frequency oscillator; a first mixer configured to output an intermediate frequency signal via a first low pass filter in response to input of a frequency signal oscillated from the first variable frequency oscillator and the sound wave signal; a second variable frequency oscillator; and a second mixer configured to output an intermediate frequency signal via a second low pass filter in response to input of a frequency signal oscillated from the second variable frequency oscillator and the sound wave signal, the setting unit is configured to set oscillation frequencies of the first variable frequency oscillator and the second variable frequency oscillator on a basis of a comparison result of output levels of intermediate frequency signals of the first mixer and the second mixer, and the detection unit is configured to detect the formant frequency band on a basis of a comparison result group of the output levels of the intermediate frequency signals of the first mixer and the second mixer, a setting history of a set frequency of each of the first variable frequency oscillator and the second variable frequency oscillator by the setting unit, and a frequency characteristic of each of the first low pass filter and the second low pass filter.

13. The sound wave signal processing apparatus according to claim 12, wherein the first mixer is configured to receive input of a first frequency signal oscillated from the first variable frequency oscillator, of which an oscillation frequency is set to a first set frequency by the setting unit, and the sound wave signal, and output a first intermediate frequency signal, the second mixer is configured to receive input of a second frequency signal oscillated from the second variable frequency oscillator, of which an oscillation frequency is set to a second set frequency higher than the first set frequency by the setting unit, and the sound wave signal, and output a second intermediate frequency signal, the setting unit is configured to, when an output level of the first intermediate frequency signal is lower than an output level of the second intermediate frequency signal, set the oscillation frequency of the first variable frequency oscillator to a third set frequency higher than the first set frequency and set the oscillation frequency of the second variable frequency oscillator to a fourth set frequency higher than the second set frequency and the third set frequency, the first mixer is configured to receive input of a third frequency signal oscillated from the first variable frequency oscillator, of which the oscillation frequency is set to the third set frequency by the setting unit, and the sound wave signal, and output a third intermediate frequency signal, the second mixer is configured to receive input of a fourth frequency signal oscillated from the second variable frequency oscillator, of which the oscillation frequency is set to the fourth set frequency by the setting unit, and the sound wave signal, and output a fourth intermediate frequency signal, and the detection unit is configured to, when an output level of the fourth intermediate frequency signal is lower than an output level of the third intermediate frequency signal, detect, as the formant frequency band, a frequency band between a common frequency, at which a gain when a first transfer function based on a frequency characteristic of the first low pass filter set to the first set frequency is multiplied by a predetermined first coefficient with respect to the first mixer and a gain when a second transfer function based on a frequency characteristic of the second low pass filter set to the second set frequency is multiplied by a predetermined second coefficient with respect to the second mixer are the same, and a common frequency, at which a gain when a first transfer function based on a frequency characteristic of the first low pass filter set to the third set frequency is multiplied by the first coefficient and a gain when a second transfer function based on a frequency characteristic of the second low pass filter set to the fourth set frequency is multiplied by the second coefficient are the same.

14. The sound wave signal processing apparatus according to claim 12, wherein the first mixer is configured to receive input of a first frequency signal oscillated from the first variable frequency oscillator, of which an oscillation frequency is set to a first set frequency by the setting unit, and the sound wave signal, and output a first intermediate frequency signal, the second mixer is configured to receive input of a second frequency signal oscillated from the second variable frequency oscillator, of which an oscillation frequency is set to a second set frequency higher than the first set frequency by the setting unit, and the sound wave signal, and output a second intermediate frequency signal, the setting unit is configured to, when an output level of the first intermediate frequency signal is higher than an output level of the second intermediate frequency signal, set the oscillation frequency of the first variable frequency oscillator to a third set frequency lower than the first set frequency and set the oscillation frequency of the second variable frequency oscillator to a fourth set frequency lower than the second set frequency and higher than the third set frequency, the first mixer is configured to receive input of a third frequency signal oscillated from the first variable frequency oscillator, of which the oscillation frequency is set to the third set frequency by the setting unit, and the sound wave signal, and output a third intermediate frequency signal, the second mixer is configured to receive input of a fourth frequency signal oscillated from the second variable frequency oscillator, of which the oscillation frequency is set to the fourth set frequency by the setting unit, and the sound wave signal, and output a fourth intermediate frequency signal, and the detection unit is configured to, when an output level of the fourth intermediate frequency signal is higher than an output level of the third intermediate frequency signal, detect, as the formant frequency band, a frequency band between a common frequency, at which a gain when a first transfer function based on a frequency characteristic of the first low pass filter set to the first set frequency is multiplied by a predetermined first coefficient with respect to the first mixer and a gain when a second transfer function based on a frequency characteristic of the second low pass filter set to the second set frequency is multiplied by a predetermined second coefficient with respect to the second mixer are the same, and a common frequency, at which a gain when a first transfer function based on a frequency characteristic of the first low pass filter set to the third set frequency is multiplied by the first coefficient and a gain when a second transfer function based on a frequency characteristic of the second low pass filter set to the fourth set frequency is multiplied by the second coefficient are the same.

15. The sound wave signal processing apparatus according to claim 7, wherein the second set frequency and the third set frequency are the same.

16. The sound wave signal processing apparatus according to claim 13, wherein the second set frequency and the third set frequency are the same.

17. The sound wave signal processing apparatus according to claim 8, wherein the first set frequency and the fourth set frequency are the same.

18. The sound wave signal processing apparatus according to claim 14, wherein the first set frequency and the fourth set frequency are the same.

19. The sound wave signal processing apparatus according to claim 1, further comprising a collation unit configured to output a trigger signal for causing an apparatus to start predetermined processing by collating a temporal change pattern of the formant frequency band detected by the detection unit with a temporal change pattern of a formant frequency band in a predetermined sound wave for causing the apparatus to start the predetermined processing.

20. A sound wave detection method comprising:

extracting, by an extraction unit, from a sound wave signal, a plurality of frequency signals indicating respective frequency components of a plurality of frequency bands including different set frequencies;

updating the different set frequencies when a comparison result between output levels of the frequency signals of the different set frequencies extracted by the extraction unit does not satisfy a predetermined condition;

performing peak determination on a basis of a comparison result group and a setting history of the set frequencies when the comparison result satisfies the predetermined condition; and detecting a formant frequency band including a formant frequency in the sound wave signal on a basis of a result of the peak determination and a frequency characteristic of the extraction unit.

* * * * *